(12) United States Patent  (10) Patent No.: US 7,168,826 B2
Imade  (45) Date of Patent: Jan. 30, 2007

(54) LIGHT GUIDING APPARATUS, LIGHTING APPARATUS, SPACE MODULATION PART, AND IMAGE PROJECTION APPARATUS

(75) Inventor: Shinichi Imade, Iruma (JP)

(73) Assignee: Olympus Corporation, Tokyo (JP)

( * ) Notice: Subject to any disclaimer, the term of this patent is extended or adjusted under 35 U.S.C. 154(b) by 16 days.

(21) Appl. No.: 11/178,911

(22) Filed: Jul. 11, 2005

(65) Prior Publication Data

US 2006/0028838 A1  Feb. 9, 2006

(30) Foreign Application Priority Data

Aug. 9, 2004  (JP)  ............................. 2004-232186

(51) Int. Cl.
*F21V 5/04* (2006.01)
(52) U.S. Cl. ...................... 362/268; 362/282; 362/319; 362/616; 385/16
(58) Field of Classification Search ........ 362/280–284, 362/319, 324, 616, 628, 268; 385/16
See application file for complete search history.

(56) References Cited

U.S. PATENT DOCUMENTS 6,863,419 B2 * 3/2005 Kodama et al. ............ 362/268

FOREIGN PATENT DOCUMENTS

JP  08-234109  9/1996
JP  3048353  3/2000

OTHER PUBLICATIONS

Fixel Ltd., "Shutter Arrays for Projection Displays", Israel, Jun. 2002, pp. 1-3.

* cited by examiner

*Primary Examiner*—Sandra O'Shea
*Assistant Examiner*—James W Cranson, Jr.
(74) *Attorney, Agent, or Firm*—Volpe and Koenig, P.C.

(57) ABSTRACT

A light guiding apparatus has a first transparent member, a second transparent member, and a transparent member holding portion. The first transparent member has a light entry surface, a first side surface at which guidance of light by way of complete reflection of the emitted light is performed when the second transparent member is separated, and the emitted light is transmitted into the second transparent member when the second transparent member is in contact, and a first light emitting end surface. The second transparent member has a second side surface, and a third side surface at which when the two side surfaces are in contact with each other, guidance of light toward at least the first light emitting end surface by way of complete reflection of the emitted light is performed.

28 Claims, 22 Drawing Sheets

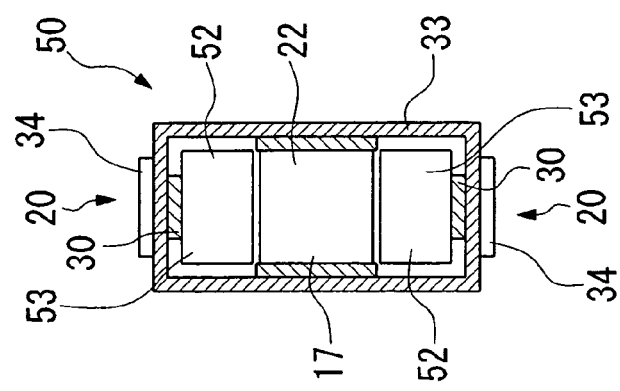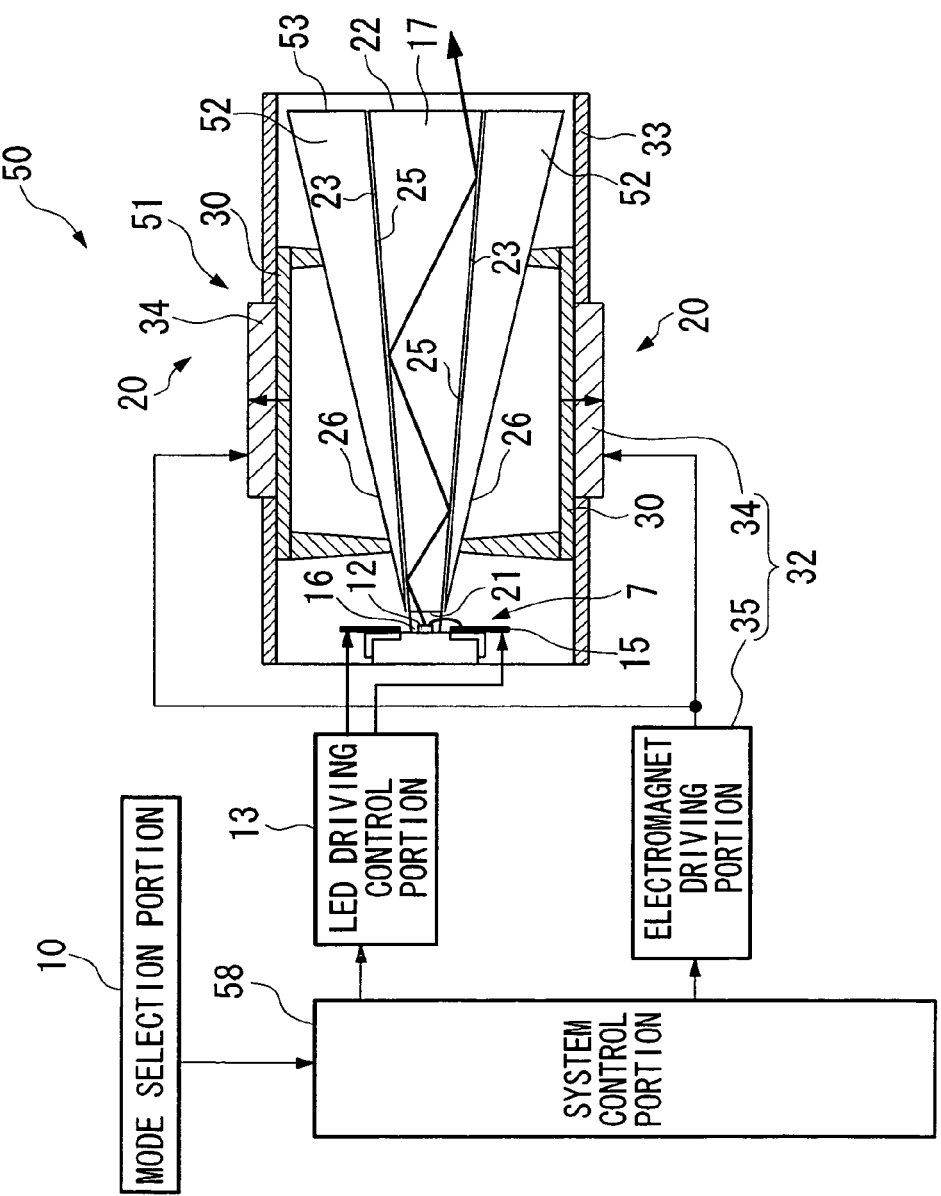
FIG.7B
FIG.7A

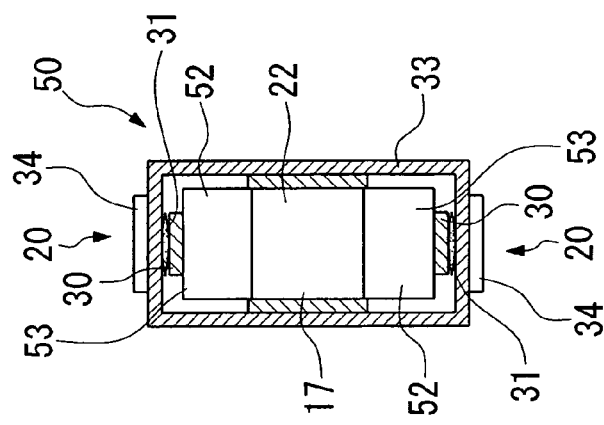
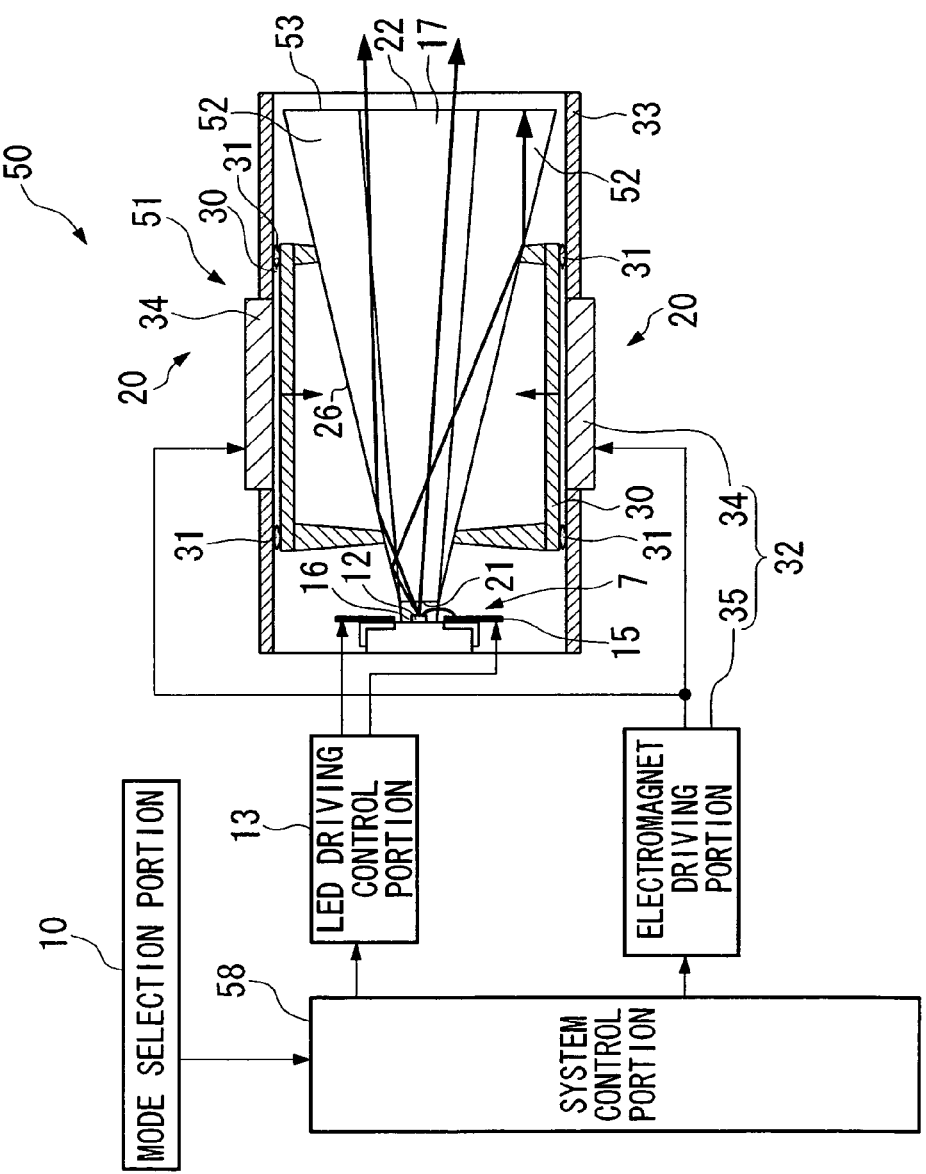

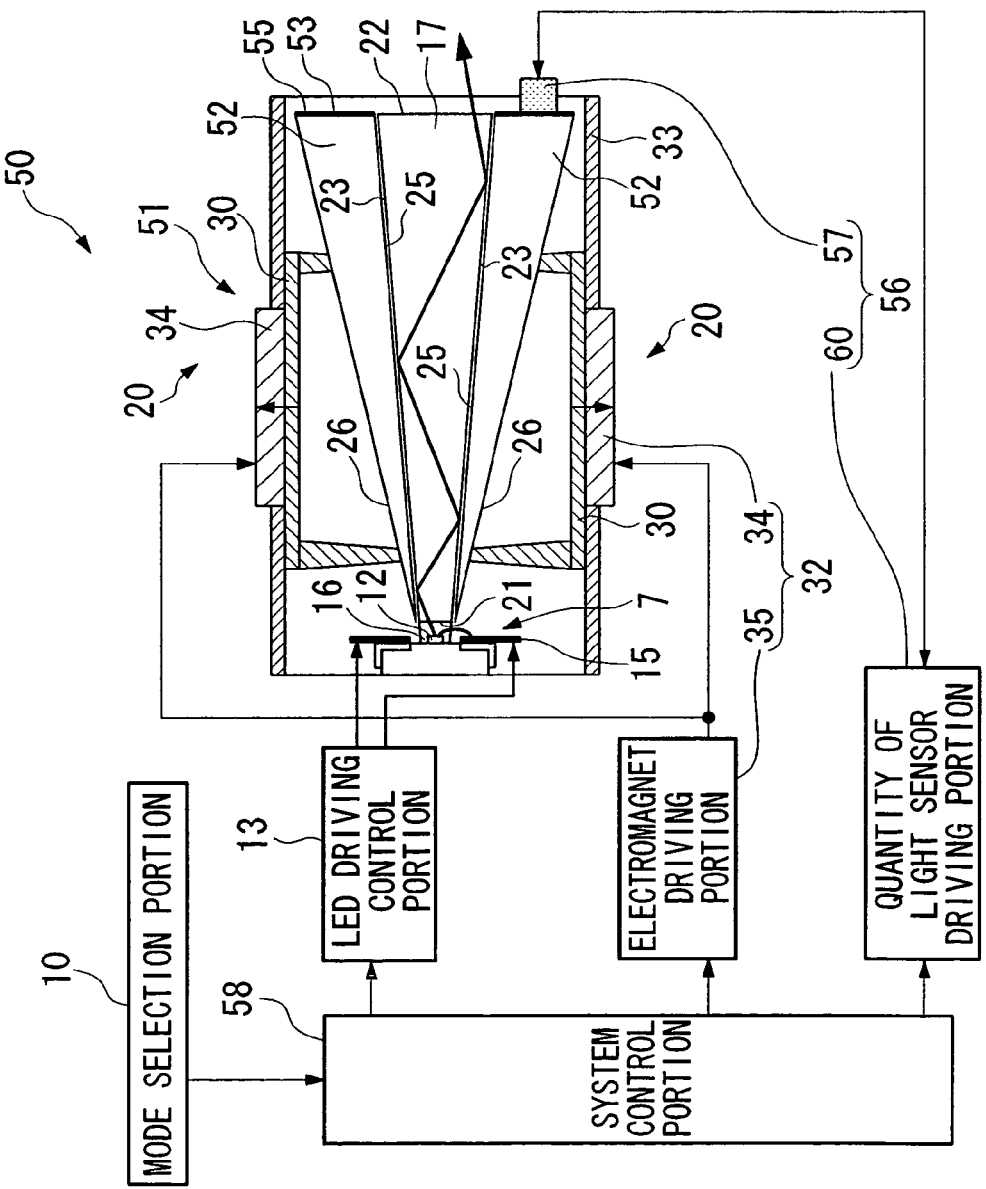

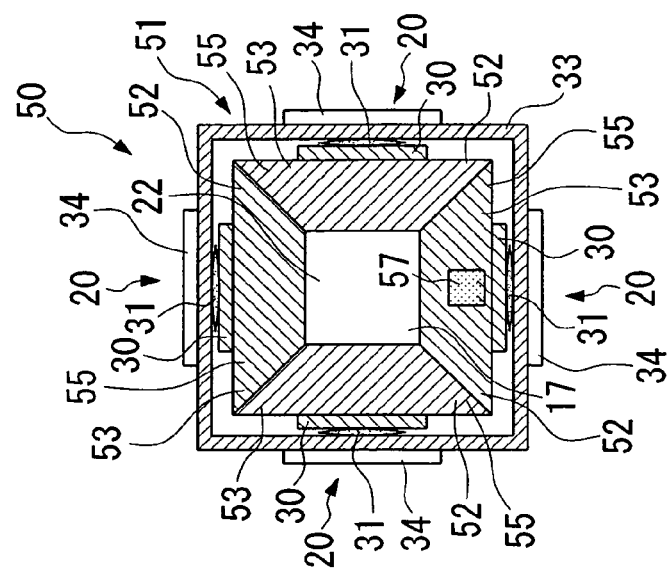
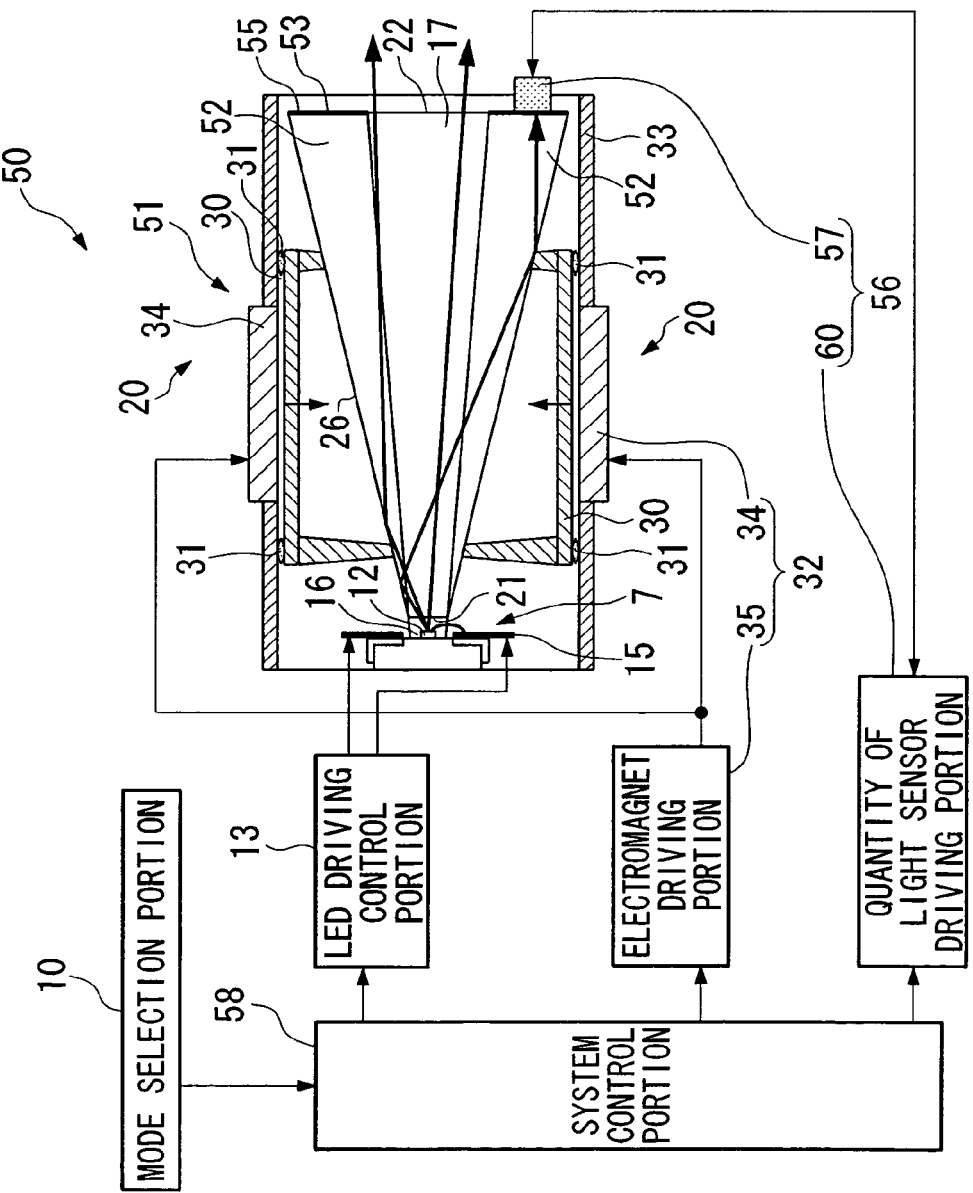
FIG.10A
FIG.10B

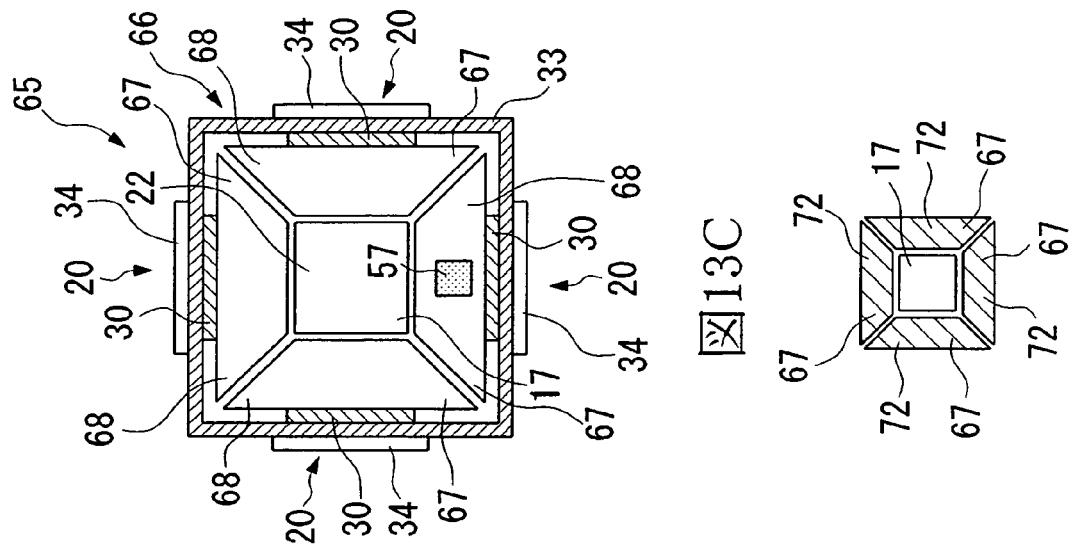
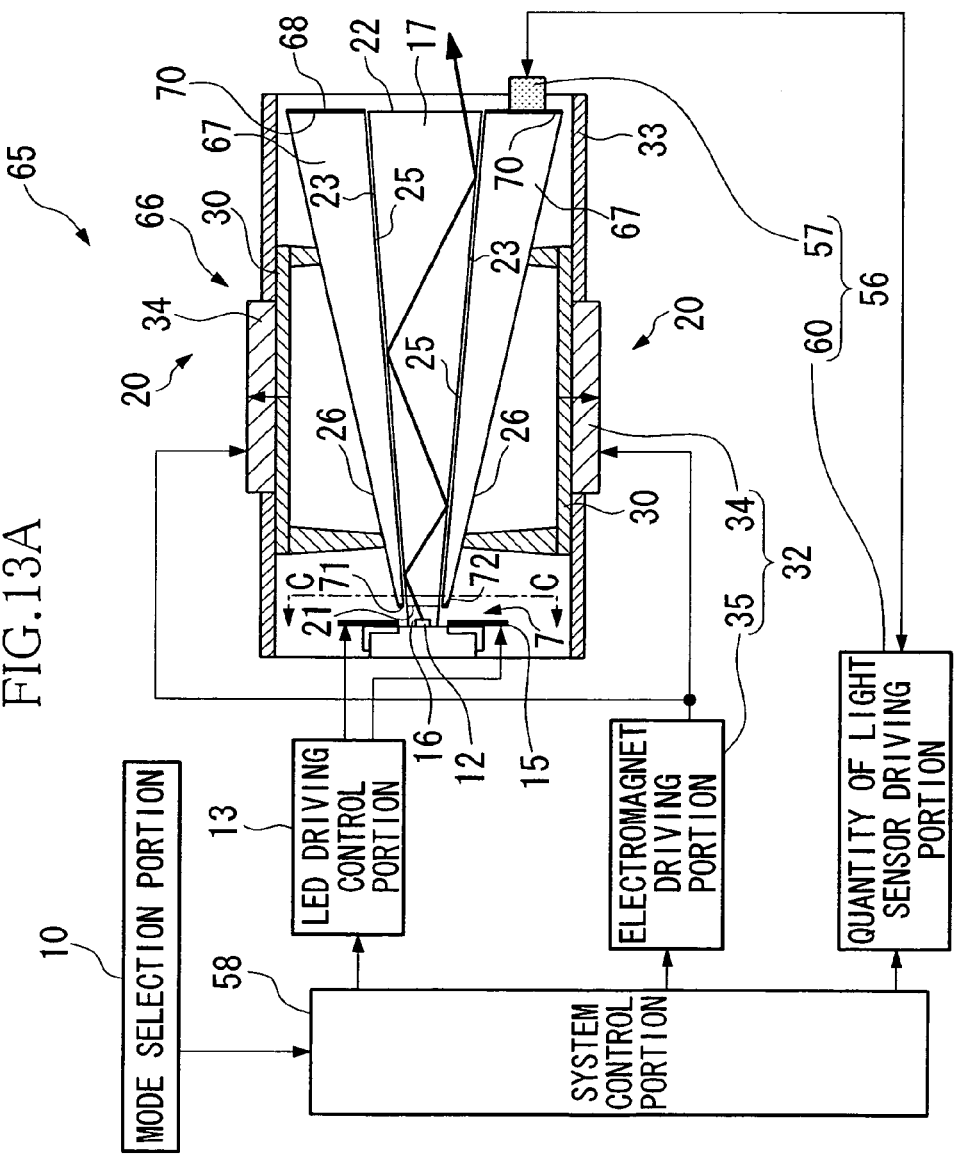
FIG. 13A
FIG. 13B
図13C

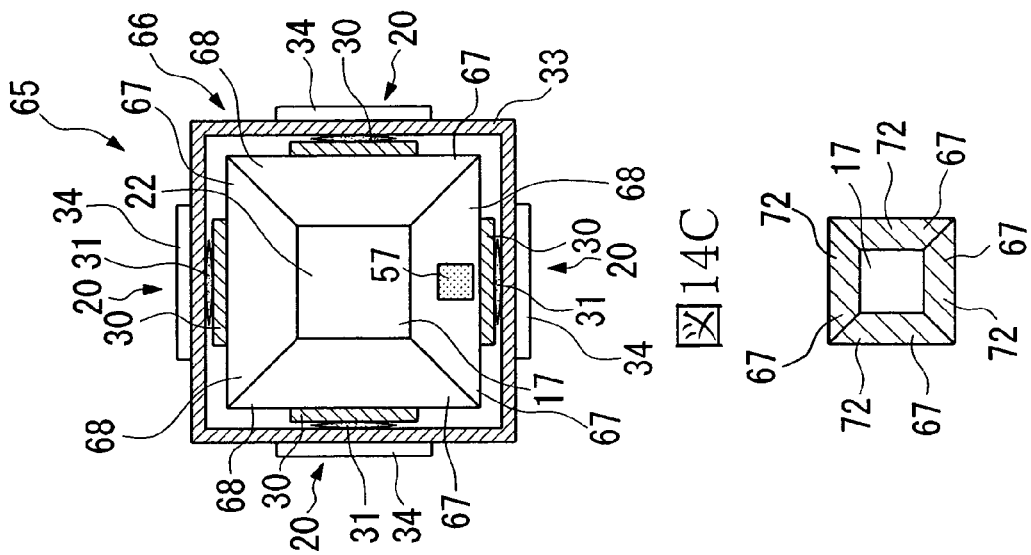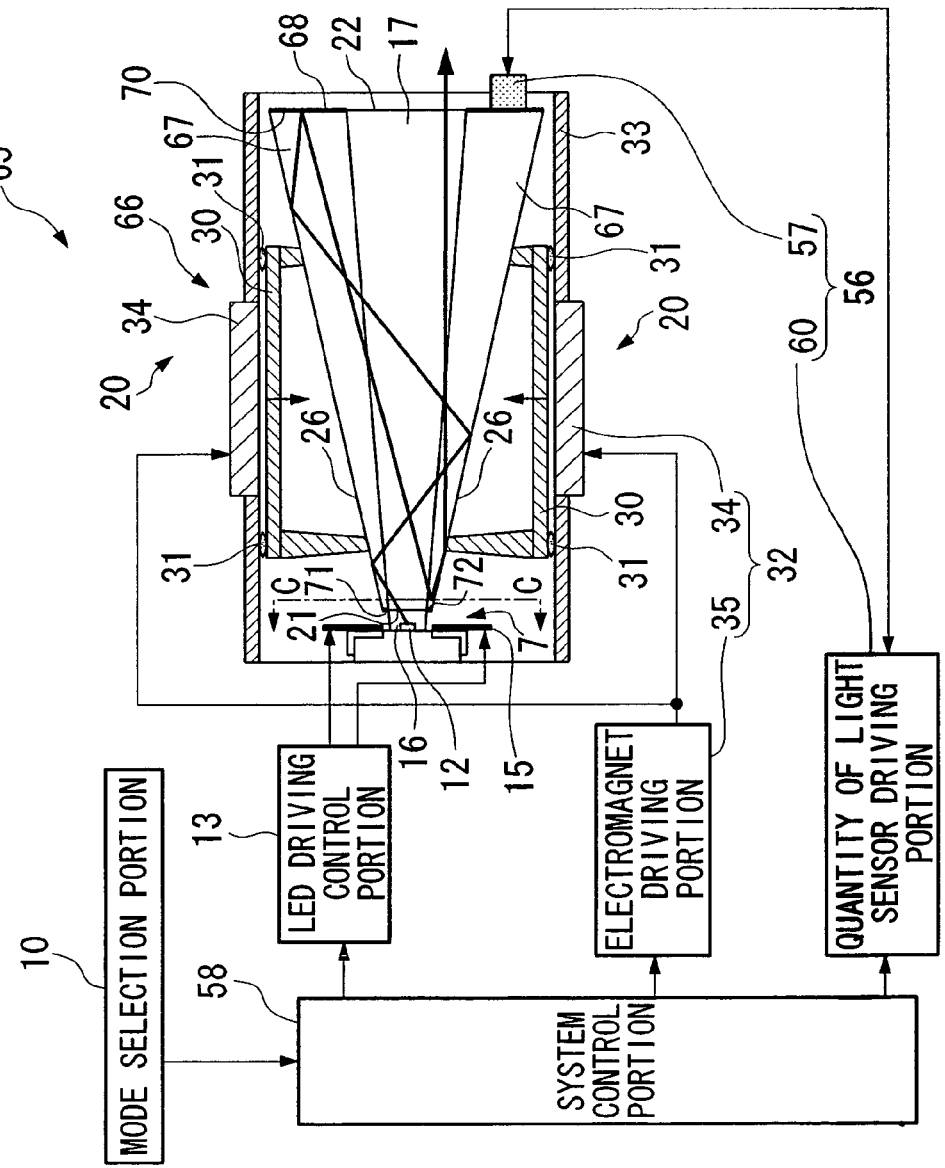

LIGHT GUIDING APPARATUS, LIGHTING APPARATUS, SPACE MODULATION PART, AND IMAGE PROJECTION APPARATUS

BACKGROUND OF THE INVENTION

1. Field of the Invention

The present invention relates to a light guiding apparatus, a lighting apparatus, a space modulation part, and an image projection apparatus.

Priority is claimed on Japanese Patent Application No. 2004-232186, filed Aug. 9, 2004, the content of which is incorporated herein by reference.

2. Description of Related Art

Concurrent with the rapid increase in the luminance level of light emitting diodes (LEDs), lighting apparatuses which employ high luminance LEDs are being used instead of so called lamp lighting apparatuses, which use a conventional halogen lamp or xenon lamp.

Because, compared to conventional lamp light sources, LEDs have a long lifetime, the response time thereof is quick, and the color rendering properties thereof are excellent, the LED is said to be a next-generation light source which has very high utility. Recently, the luminance level of white color LEDs as well as red color, green color, and blue color of LEDs is increasing quickly, and the practical usability of white color LEDs has advanced to the point where conventional white color lighting apparatuses can be replaced by white LEDs.

Furthermore, although there are plans to replace conventional head lamps of vehicles with LED light sources, both a mode which illuminates widely for a short distance and a high beam mode which illuminates to a long distance are needed.

Generally, for the lighting apparatuses, both a use in which such a comparatively wide range of uniform illumination and another use in which a comparatively narrow range of illumination as in a spot light are thought of.

In order to obtain a light of which the spot-lighting ability is high from an LED light source, various examples are proposed in which a wedge shaped light guiding rod (hereinafter called the "taper rod"), which has a function in which an emitted light beam angle is reduced, is applied. (For example, Patent Document 1: Japanese Unexamined Patent Application, First Publication No. H8-234109, and Patent Document 2: Japanese Patent No. 3048353).

The effect of the light beam angle change by the taper rod is determined by the ratio of the light entry area to a light emission area, and in the case in which the light emission area when compared to the light entry area is large, the light beam angle becomes smaller. In a conventional example, in general, a shape of the taper rod in which the allowable light beam angle and the light emission area necessary for the emitted light are satisfied is fixedly determined, and is applied.

On the other hand, an image projection apparatus such as a projector or the like is provided with a display device as a space modulation part in order to modulate the emitted light from the lighting apparatus and generate the projection image. When, for example, such a taper rod is used in the lighting apparatus of the projector, a taper rod is used in which the light beam angle can be made as small as the display device allows.

As such a display device, a display device is proposed in which a plurality of cells which have minute shutter structures are arranged in a matrix shape, and the individual shutters can individually be opened or closed at high speed (for example, Non-Patent Document 1: Fixel Ltd., "Shutter Arrays for Projection Displays", Israel, June, 2002).

In such a display device, when the emitted light is emitted, control is performed so that the light beam is transmitted through cells in which the shutter is opened, and the light beam is blocked out by cells in which the shutter is closed. Furthermore, the emitted light is modulated by the time ratio of the opening and closing states of the shutters, and a projection image can be generated.

In the case of such a transmission type of display device, the optical components arranged on an optical path from the lighting apparatus to the projection lens can be constituted along a straight line, and a simple constitution and which is suitable for miniaturization can be realized. Moreover, because in the transmission type of display device, polarized light transformation is not involved as in the case of liquid crystals, it is also advantageous in view of light use efficiency.

SUMMARY OF THE INVENTION

An object of the present invention is to provide a light guiding apparatus which has a mode in which bright light emission is performed at a wide angle, and another mode in which light emission is performed at a narrow angle (the light emission angle is small), and the modes thereof are simply switched The present invention further provides a lighting apparatus and an image projection apparatus which are provided with the light guiding apparatus, and a space modulation part with which transmission and interruption of the emitted light are easy, and the switching thereof can be performed at high speed.

The present invention adopts the following constitutions.

The present invention provides a light guiding apparatus which guides emitted light emitted from a light source, having a first transparent member which is solid, a second transparent member which is solid and is moved relatively to the first transparent member to take a contact position where the second transparent member is in contact with the first transparent member or a separate position where the second transparent member is separated from the first transparent member, and a transparent member holding portion which moves the second transparent member relatively to the first transparent member, and holds the second transparent member in one of the contact or separate position, wherein the first transparent member is provided with a light entry surface into which the emitted light enters, a first side surface in which light guidance is performed to the emitted light entering the light entry surface by way of complete reflection by an inner surface thereof when the second transparent member is in the separate position, and in which the emitted light is transmitted into the second transparent member when the second transparent member is in the contact position, and a first light emitting end surface which emits the emitted light which is guided, and wherein the second transparent member is provided with a second side surface which faces the first side surface so that the second side surface can contact the first side surface, and a third side surface in which, when the second side surface and the first side surface are in contact with each other, light guidance toward at least the first light emitting surface is performed to the emitted light which is entering the second side surface by way of complete reflection by an inner surface thereof.

The present invention provides a light guiding apparatus which guides emitted light emitted from a light source, having a first transparent member which is solid, a second transparent member which is solid and is moved relatively to the first transparent member to take a contact position where the second transparent member is in contact with the first transparent member or a separate position where the second transparent member is separated from the first transparent member, and a transparent member holding portion which moves the second transparent member relatively to the first transparent member, and holds the second transparent member in one of the contact or separate position, wherein the first transparent member is provided with a light entry surface into which the emitted light enters, a first side surface in which light guidance is performed to the emitted light entering the light entry surface by way of complete reflection by an inner surface thereof when the second transparent member is in the separate position, and in which the emitted light is transmitted into the second transparent member when the second transparent member is in the contact position, and a first light emitting end surface which emits the emitted light which is guided, and wherein the second transparent member is provided with a second side surface which faces the first side surface so that the second side surface can contact the first side surface, and a second light emitting end surface which emits the emitted light entering the second side surface.

Moreover, in the light guiding apparatus according to the present invention, the transparent member holding portion may be provided with an elastic body which presses the second transparent member toward a direction of the first transparent member, and a separation portion which reverses a pressed state created by the elastic body.

Moreover, in the light guiding apparatus according to the present invention, the separation portion may be an electromagnet.

Moreover, in the light guiding apparatus according to the present invention, the separation portion may be provided with a rotation portion in which, about a normal line which passes through a center of the first light emitting end surface as a rotation axis, the first transparent member and the second transparent member are rotated, and centrifugal force which is greater than a pressing force of the elastic body is generated on the second transparent member.

It is also possible, in the light guiding apparatus according to the present invention, that a direction of a normal line of the first light emitting end surface is a direction of a longitudinal axis of the first transparent member, and the second transparent member has a second light emitting end surface which emits at least one among emitted light entering the second side surface and emitted light guided by the third side surface and may be arranged along the direction of the longitudinal axis.

Moreover, in the light guiding apparatus according to the present invention, when a profile of the first transparent member viewed perpendicularly to the direction of the longitudinal axis of the first transparent member is a first profile, a cross-section of the first profile may gradually enlarge from a side of the light entry surface to a side of the first light emitting end surface, and when a profile of the second transparent member viewed perpendicularly to the direction of the longitudinal axis of the first transparent member is a second profile, a cross-section of the second profile may gradually enlarge from a side of the light entry surface to a side of the first light emitting end surface.

Moreover, in the light guiding apparatus according to the present invention, when a profile of the first transparent member viewed perpendicularly to the direction of the longitudinal axis of the first transparent member is a first profile, a cross-section of the first profile may gradually enlarge from a side of the light entry surface to a side of the first light emitting end surface, and when a profile of the second transparent member viewed perpendicularly to the direction of the longitudinal axis of the first transparent member is a second profile, a cross-section of the second profile may gradually get smaller from a side of the light entry surface to a side of the first light emitting end surface, and cross-sections of a total profile which is composed of the first profile and the second profile which are formed when the second transparent member is in the contact position may be approximately the same at unprescribed positions in the direction of the longitudinal axis.

Moreover, in the light guiding apparatus according to the present invention, when a profile of the first transparent member viewed perpendicularly to the direction of the longitudinal axis of the first transparent member is a first profile, cross-sections of the first profile may be approximately the same at unprescribed positions in the direction of the longitudinal axis, and when a profile of the second transparent member viewed perpendicularly to the direction of the longitudinal axis of the first transparent member is a second profile, a cross-section of the second profile may gradually increase from a side of the light entry surface to a side of the first light emitting end surface.

Moreover, in the light guiding apparatus according to the present invention, both the first side surface and the second side surface may be planar surfaces.

Moreover, in the light guiding apparatus according to the present invention, an index of refraction of a medium which constitutes the first transparent member and an index of refraction of a medium which constitutes the second transparent member may be the same.

Moreover, in the light guiding apparatus according to the present invention, the light entry surface may be a planar surface viewed perpendicularly to the normal line of the first light emitting end surface, a total light emitting surface may be formed by the first light emitting end surface and the second light emitting end surface in a state in which the second transparent member is in the contact position, and the light entry surface and the total light emitting surface may resemble each other.

Moreover, in the light guiding apparatus according to the present invention, a plurality of parts of the first side surface may be arranged in axial symmetry with respect to the longitudinal axis, and a plurality of parts of the second transparent member may be arranged so that the second side surface faces each first side surface so that the second side surface can contact the first side surface.

Moreover, in the light guiding apparatus according to the present invention, a light absorbing portion which absorbs the emitted light may be arranged at the second light emitting end surface.

Moreover, in the light guiding apparatus according to the present invention, a light reflection portion which reflects the emitted light may be arranged at the second light emitting end surface.

Moreover, in the light guiding apparatus according to the present invention, a first light reflection portion which is approximately parallel to the first light emitting end surface and reflects the emitted light may be arranged near the light entry surface of the first transparent member.

Moreover, in the light guiding apparatus according to the present invention, a second light reflection portion which is approximately parallel to the second light emitting end surface, and reflects the emitted light may be arranged at the second transparent member near the light entry surface.

Moreover, in the light guiding apparatus according to the present invention, a quantity of light detection portion which detects a quantity of light of a part of the emitted light which reaches the light absorbing portion or the light reflection portion may be provided.

Moreover, in the light guiding apparatus according to the present invention, a light absorbing portion which absorbs the emitted light may be arranged on the first light emitting end surface.

Moreover, a lighting apparatus according to the present invention is provided with the light guiding apparatus according to the present invention, a light source portion which emits the emitted light, a mode selection portion which selects one of a wide angle light emitting mode in which wide angle light emitting is performed and a narrow angle light emitting mode in which narrow angle light emitting is performed as a light emitting mode in which light is emitted from the light guiding apparatus, wherein the wide angle light emitting mode is in a state in which the second transparent member is separated from the first transparent member, and the narrow angle light emitting mode is in a state in which the second transparent member is in contact with the first transparent member.

Moreover, in the lighting apparatus according to the present invention, a reflection surface may be provided from which the emitted light emitted from the light source portion is reflected once, and enters the first transparent member.

Moreover, a space modulation part according to the present invention is a space modulation part which is modulated according to image information which is input, and is provided with a plurality of light guiding apparatuses according to the present invention, wherein, in the light guiding apparatuses, normal lines of the light entry surfaces are parallel to each other, and normal lines of the second light emitting end surfaces are parallel to each other, and the normal lines of the light entry surfaces and the normal lines of the second light emitting end surfaces are parallel to each other.

Moreover, in the space modulation part according to the present invention, the first transparent member and the second transparent member may be right-angled prisms, the light entry surface and the first light emitting end surface may be perpendicularly arranged, and the second side surface and the second light emitting end surface may be arranged in contact with each other at an angle of 45 degrees.

Moreover, an image projection apparatus according to the present invention is an image projection apparatus which projects an image according to image information which is input so that an observer observes the image, and is provided with the lighting apparatus according to the present invention, a space modulation part which is modulated according to the image information which is input, a light emitting optical portion which guides the emitted light emitted from at least the first light emitting end surface, and illuminates the space modulation part, and a projection optical portion which projects an image which is cast by the light emitting optical portion, and is modulated by the space modulation part.

Moreover, in the image projection apparatus according to the present invention, the space modulation part may be the space modulation part according to the present invention.

BRIEF DESCRIPTION OF THE DRAWINGS

FIG. 7A is a cross-sectional view which shows a state in a wide angle light emitting mode of a modified example of the lighting apparatus and the light guiding apparatus according to the first embodiment of the present invention.

FIG. 7B is a front view which shows a state in a wide angle light emitting mode of a modified example of a lighting apparatus and a light guiding apparatus according to the first embodiment of the present invention.

FIG. 8A is a cross-sectional view which shows a state in a narrow angle light emitting mode of a modified example of the lighting apparatus and the light guiding apparatus according to the first embodiment of the present invention.

FIG. 8B is a front view which shows a state in a narrow angle light emitting mode of a modified example of a lighting apparatus and a light guiding apparatus according to the first embodiment of the present invention.

FIG. 9A is a cross-sectional view which shows a state in a wide angle light emitting mode of the lighting apparatus and the light guiding apparatus according to the second embodiment of the present invention.

FIG. 9B is a front view which shows a state in a wide angle light emitting mode of a lighting apparatus and a light guiding apparatus according to the second embodiment of the present invention.

FIG. 10A is a cross-sectional view which shows a state in a narrow angle light emitting mode of a lighting apparatus and a light guiding apparatus according to the second embodiment of the present invention.

FIG. 10B is a front view which shows a state in a narrow angle light emitting mode of a lighting apparatus and a light guiding apparatus according to the second embodiment of the present invention.

FIG. 13A is a cross-sectional view which shows a state in a wide angle light emitting mode of the lighting apparatus and the light guiding apparatus according to the third embodiment of the present invention.

FIG. 13B is a front view which shows a state in a wide angle light emitting mode of a lighting apparatus and a light guiding apparatus according to the third embodiment of the present invention.

FIG. 13C is a view seen from the arrow C of FIG. 13A which shows a state in a wide angle light emitting mode of a lighting apparatus and a light guiding apparatus according to the third embodiment of the present invention.

FIG. 14A is a cross-sectional view which shows a state in a narrow angle light emitting mode of a lighting apparatus and a light guiding apparatus according to the third embodiment of the present invention.

FIG. 14B is a front view which shows a state in a narrow angle light emitting mode of a lighting apparatus and a light guiding apparatus according to the third embodiment of the present invention.

FIG. 14C is a view seen from the arrow C of FIG. 14A which shows a state in a narrow angle light emitting mode of a lighting apparatus and a light guiding apparatus according to the third embodiment of the present invention.

DETAILED DESCRIPTION OF THE INVENTION

Figure 1:
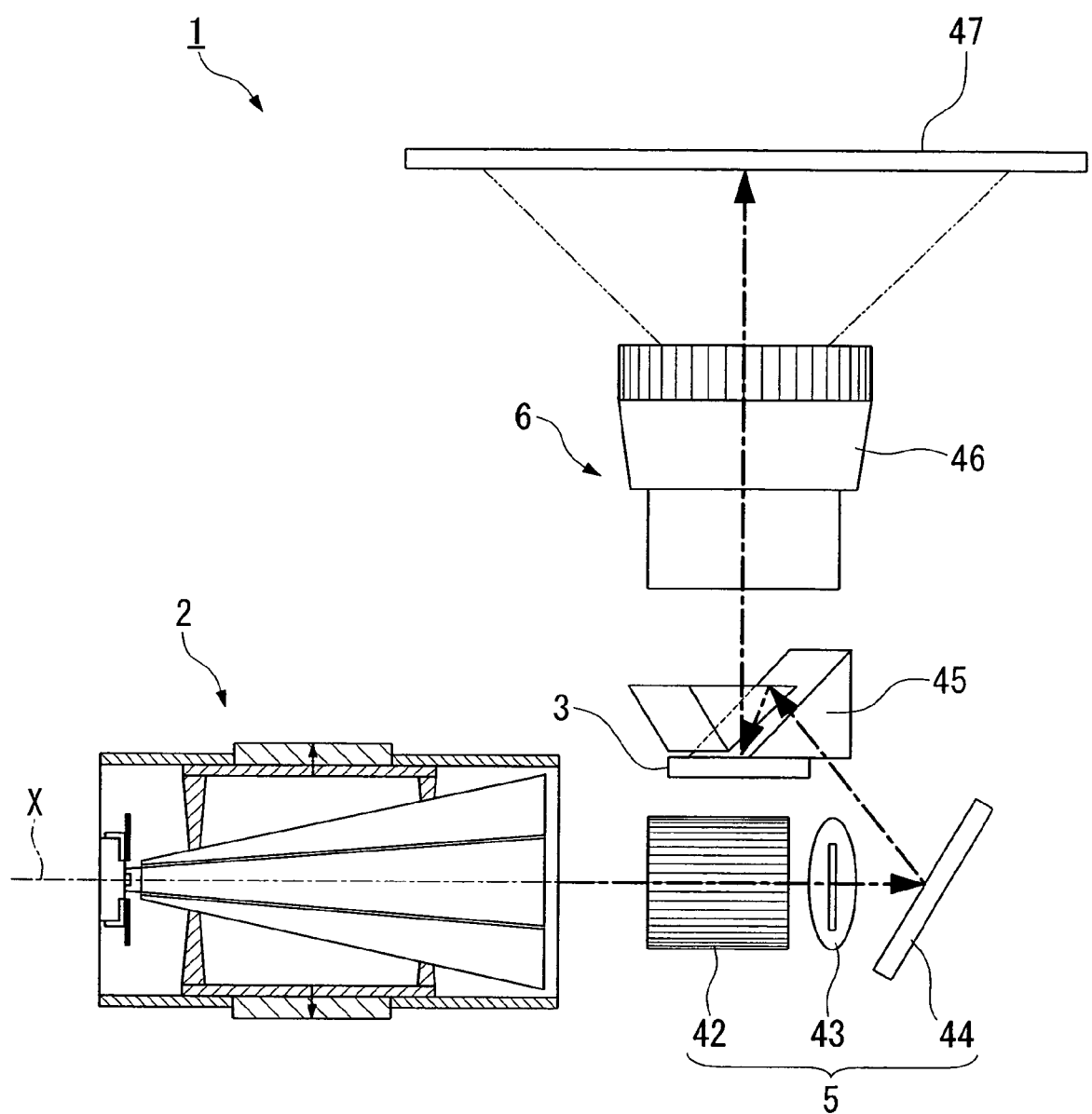
FIG. 1 is a schematic construction view of a projector according to a first embodiment of the present invention.
Figure 2:
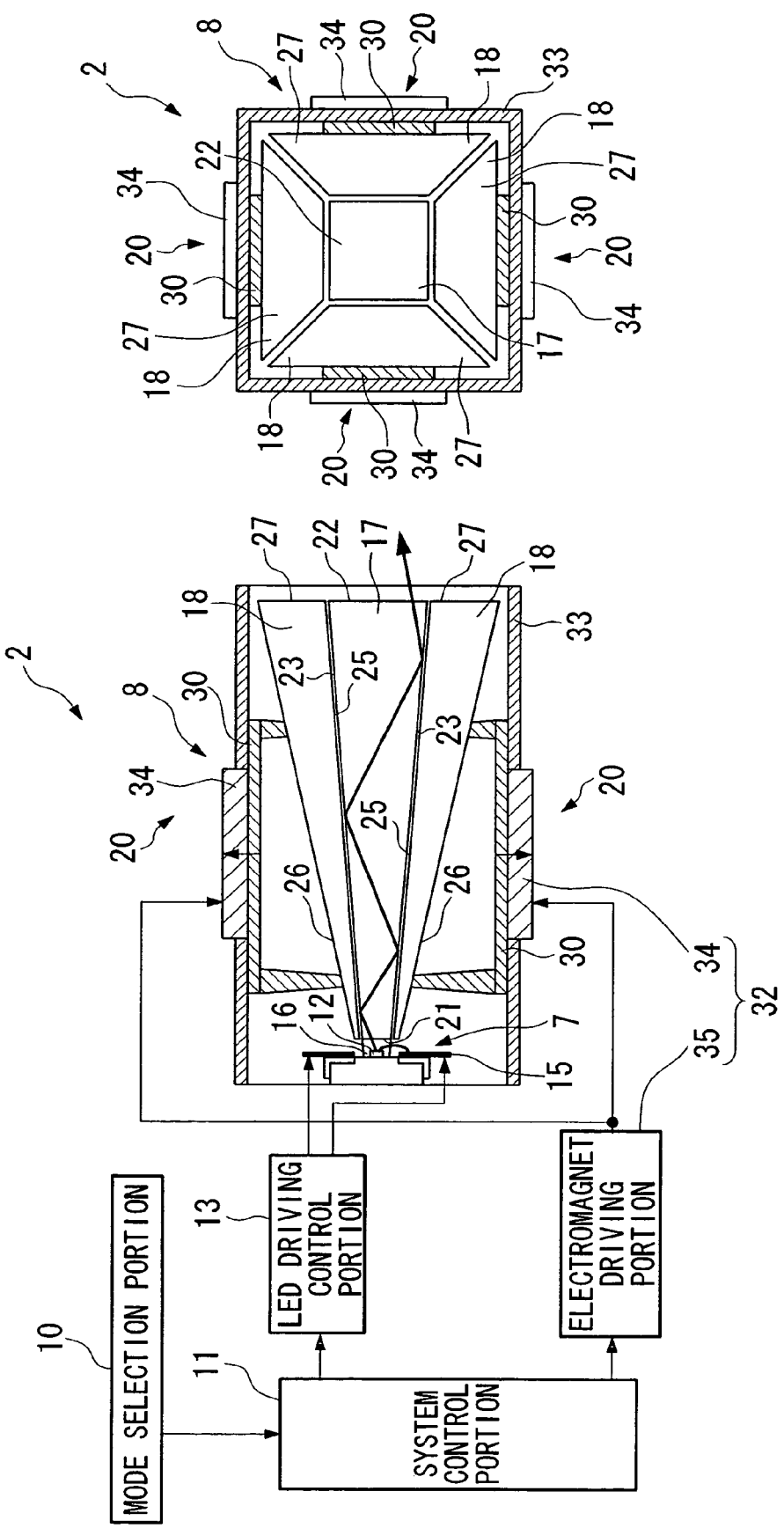
FIG. 2A is a cross-sectional view which shows a state in a wide angle light emitting mode of a lighting apparatus and a light guiding apparatus according to the first embodiment of the present invention.
FIG. 2B is a front view which shows a state in a wide angle light emitting mode of a lighting apparatus and a light guiding apparatus according to the first embodiment of the present invention.
Figure 3:
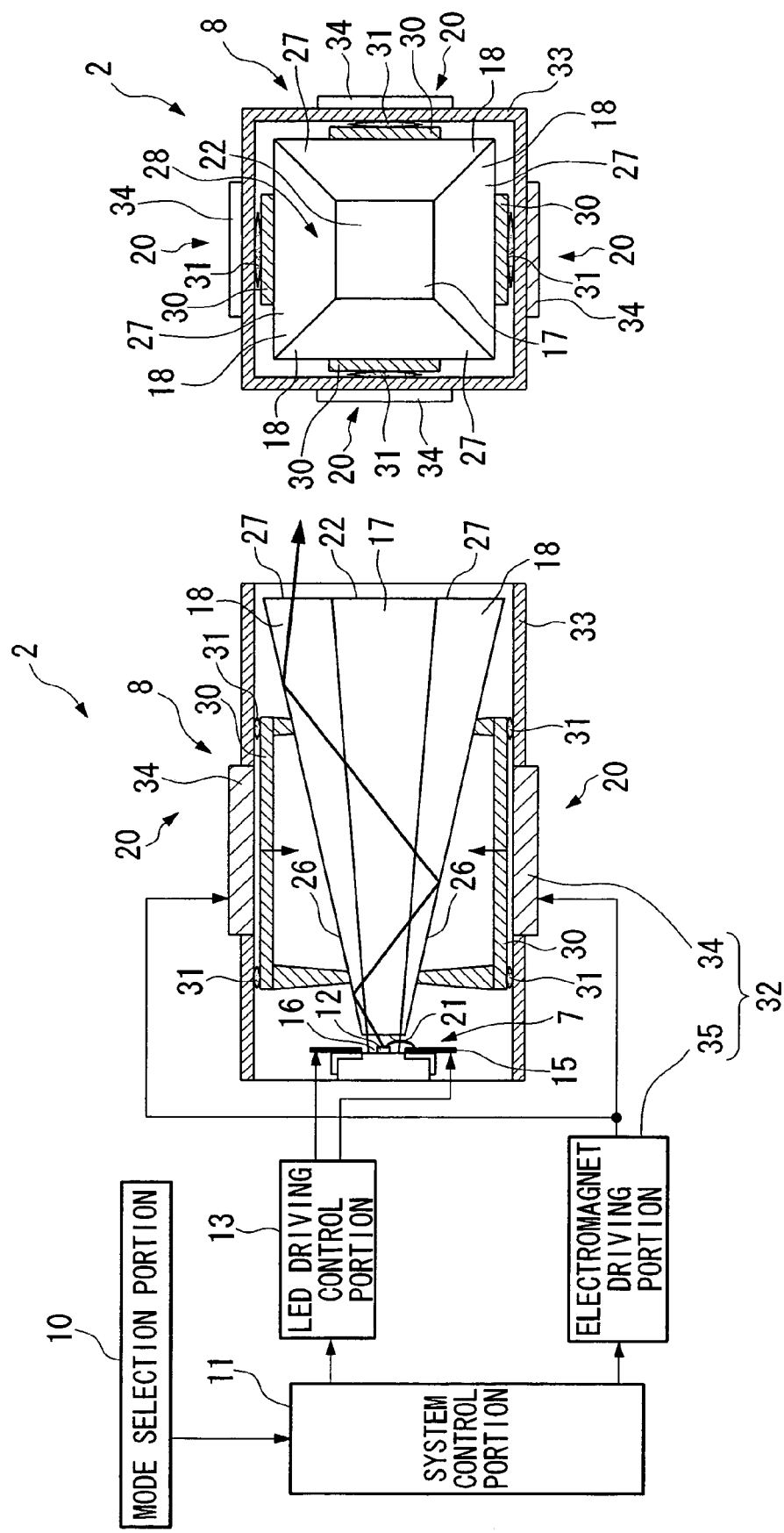
FIG. 3A is a cross-sectional view which shows a state in a narrow angle light emitting mode of a lighting apparatus and a light guiding apparatus according to the first embodiment of the present invention.
FIG. 3B is a front view which shows a state in a narrow angle light emitting mode of a lighting apparatus and a light guiding apparatus according to the first embodiment of the present invention.

A first embodiment according to the present invention is explained with reference to FIG. 1 to FIG. 6B.

A projector (image projection apparatus) 1 according to the present embodiment projects an image according to image information which is input so that an observer can observe the image. The projector 1 is provided with lighting apparatuses 2 which emit a red color, a green color, and a blue color of emitted light, respectively (in FIG. 1, for example, only the red color of lighting apparatus is shown), a display device (space modulation part) 3 which modulates the emitted light according to the image information which is input, a light emitting optical portion 5 which guides the emitted light emitted from the lighting apparatus 2, and illuminates the display device 3, and a projection optical portion which projects the image which is cast by the light emitting optical portion 5, and is modulated by the display device 3. In addition, because the constitution of each color of lighting apparatus is the same, hereinafter, the red color of lighting apparatus 2 only is explained.

As shown in FIG. 2A to FIG. 3B, the lighting apparatus 2 is provided with a light source portion 7 which emits the emitted light, a light guiding apparatus 8 which guides the emitted light emitted from the light source portion 7, a mode selection portion 10 which selects one of a wide angle light emitting mode in which wide angle light emitting is performed and a narrow angle light emitting mode in which narrow angle light emitting is performed as a light emitting mode in which the light is emitted from the light guiding apparatus 8, and a system control portion 11 which gives a mode switching direction to the light guiding apparatus 8 based on a signal from the mode selection portion 10.

The light source portion 7 is provided with an LED (light-emitting diodes) 12 which is a light source, an LED driving control portion 13 which drives the LED 12, an electrode 15 which is connected to the LED 12, and a light guiding body 16 which guides the emitted light from the LED 12, and makes the emitted light enter the light guiding apparatus 8. The LED driving control portion 13 is driven and is controlled by the direction of the system control portion 11.

The light guiding apparatus 8 is provided with a main rod (first transparent member) 17 which is solid, a secondary rod (second transparent member) 18 which is solid and is moved relatively to the main rod 17, and can be in contact with the main rod 17 or be separated from the main rod 17, and a transparent member holding portion 20 in which the secondary rod 18 is moved relatively to the main rod 17, and the secondary rod 18 is held when the main rod 17 and the secondary rod 18 are in contact with each other, or are separated from each other.

The main rod 17 has a square pillar shape which is made of transparent optical material such as glass, or the like, and is provided with one end surface (light entry surface) 21 into which the emitted light enters, and the other end surface (first light emitting end surface) 22 from which the emitted light which is guided is emitted.

Moreover, when a direction of the normal line of the other end surface 22 is a longitudinal axis X of the main rod 17, the one end surface 21 is also a planar surface viewed perpendicularly to the normal line of the other end surface 22, and four partial side surfaces which are in axial symmetry with respect to the longitudinal axis X compose a first side surface 23. The first side surface 23 is a planar surface in which complete reflection of the emitted light which is entering the one end surface 21 is performed by an inner surface thereof when the secondary rod 18 is separated, and the emitted light is transmitted into the secondary rod 18 when the secondary rod 18 is in contact.

Moreover, in the main rod 17, when a profile viewed perpendicularly to the direction of the longitudinal axis X is a first profile, a cross-section of the first profile is formed as a wedge shape so that the cross-section gradually enlarges from the one end surface 21 side to the other end surface 22 side.

The secondary rod 18 has a square pillar shape which is made of transparent optical material such as glass, or the like, and faces each first side surface 23 of the main rod 17 so that the secondary rod 18 can contact the first side surface 23, and four parts of the secondary rod 18 are arranged along the direction of the longitudinal axis X. Each part of the secondary rod 18 is provided with a part of the second side surface 25 which is opposed to the first side surface 23 so that the second side surface 25 can be in contact with the first side surface 23, a part of a third side surface 26 in which, when the second side surface 25 and the first side surface 23 are in contact with each other, guidance of light toward at least the other end surface 22 by way of complete reflection of the emitted light entering the second side surface 25 is performed by an inner surface thereof, and a part of a secondary rod light emitting end surface (second light emitting end surface) 27 which emits at least one of the emitted light entering second side surface 25 and the emitted light guided by the third side surface 26.

Moreover, in the secondary rod 18, when a profile viewed perpendicularly to the direction of the longitudinal axis X is a second profile, a cross-section of the second profile is formed as a wedge shape so that the cross-section gradually increases from the one end surface 21 of the main rod 17 to the secondary rod light emitting end surface 27.

Here, a total light emitting surface 28 is formed by the other end surface 22 and the secondary rod light emitting end surface 27 in a state in which the secondary rod 18 is in contact with the main rod 17, and the one end surface 21 and the total light emitting surface 28 have similar shapes to each other.

Moreover, an index of refraction of a medium which constitutes the main rod 17 and an index of refraction of a medium which constitutes the secondary rod 18 are the same.

The transparent member holding portion 20 is provided with a secondary rod holding portion 30 which supports the secondary rod 18, an elastic body 31 which presses the secondary rod 18 toward a direction of the first side surface 23 of the main rod 17, and a separation portion 32 which reverses a pressed state created by the elastic body 31.

The secondary rod holding portion 30 is supported on the inside surface of the outer frame 33 in which the main rod 17 and the secondary rod 18 are housed via the elastic body 31. The elastic body 31 may be spring material, rubber material, or the like.

The separation portion 32 is provided with an electromagnet 34, and an electromagnet driving portion 35 which performs ON/OFF operation of the electromagnet 34. The electromagnet driving portion 35 is connected to a system control portion 11.

Figure 4:
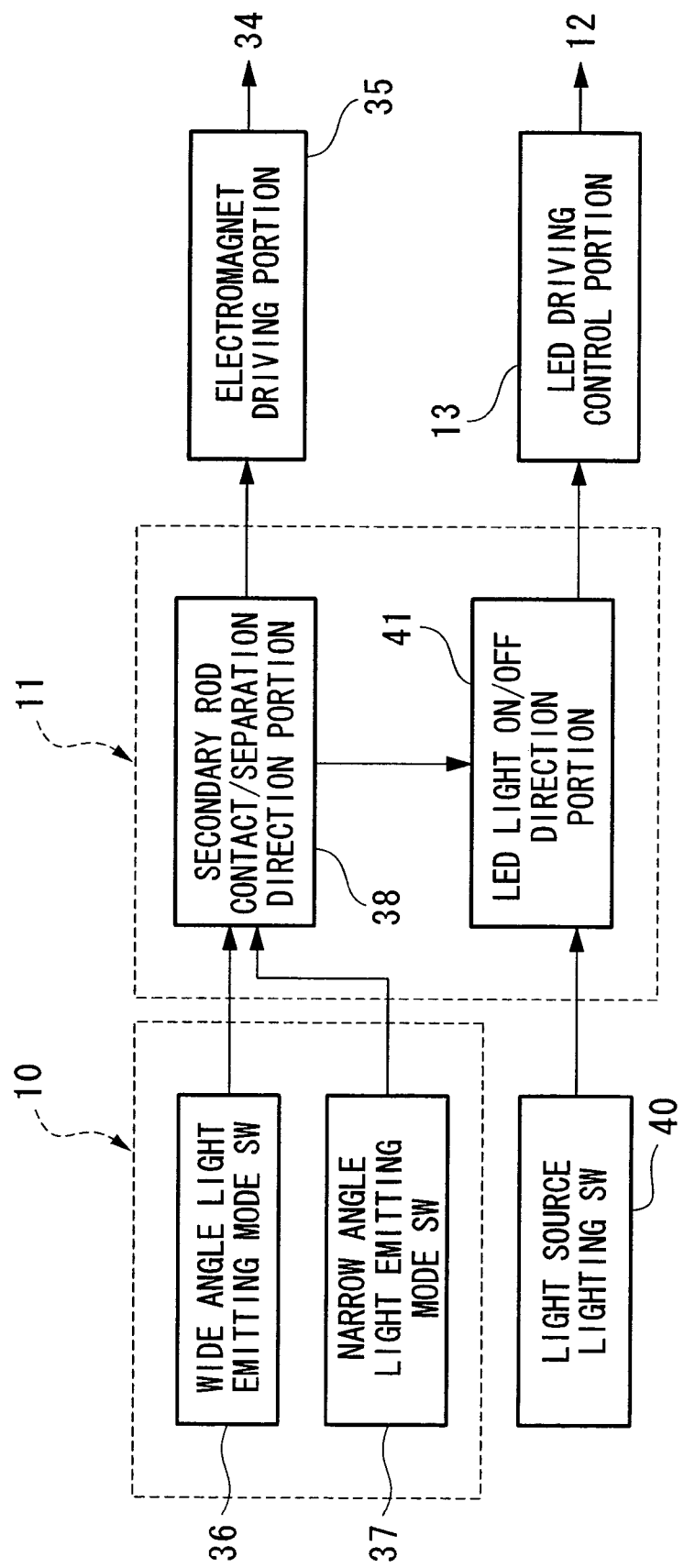
FIG. 4 is a block diagram which shows the function of the lighting apparatus according to the first embodiment of the present invention.

As shown in FIG. 4, the mode selection portion 10 is provided with the wide angle light emitting mode SW (switch) 36 and the narrow angle light emitting mode SW 37, and causes one of the wide angle light emitting mode SW 36 and the narrow angle light emitting mode SW 37 to be selected.

The system control portion 11 is provided with a secondary rod contact/separation direction portion 38 which receives the signal from the mode selection portion 10, and performs direction of the electromagnet driving portion 35, and a LED light on/off direction portion 41 which receives the signals from the light source SW 40 and the secondary rod contact/separation direction portion 38 which are provided to the lighting apparatus 2, and directs the LED driving control portion 13.

Furthermore, based on the signal from the mode selection portion 10 and light source SW 40, in the case of the wide angle light emitting mode, as shown in FIGS. 2A and 2B, the electromagnet driving portion 35 is directed, the electromagnet 34 is driven, and thereby the secondary rod 18 enters a state in which the secondary rod 18 is separated from the main rod 17 at a predetermined clearance. Moreover, in the case of the narrow angle light emitting mode, as shown in FIGS. 3A and 3B, the electromagnet 34 is not driven, and the secondary rod 18 enters a state in which the secondary rod 18 is in contact with the main rod 17.

As shown in FIG. 1, the light emitting optical portion 5 is provided with a relay lens 42 which is arranged at a position opposite the total light emitting surface 28, a lighting system diaphragm 43 which is arranged opposite the relay lens 42, a reflection mirror 44 which reflects the emitted light which is transmitted into the lighting system diaphragm 43 in the direction of the display device 3, and a TIR (total internal reflection) prism 45.

The projection optical portion 6 is provided with the projection lens 46, and projects the image which is transmitted into the display device 3 onto the screen 47.

Next, the operation method of the projector 1, the lighting apparatus 2, and the light guiding apparatus 8 according to the present embodiment, and the function and the effect thereof are explained.

Figure 5:
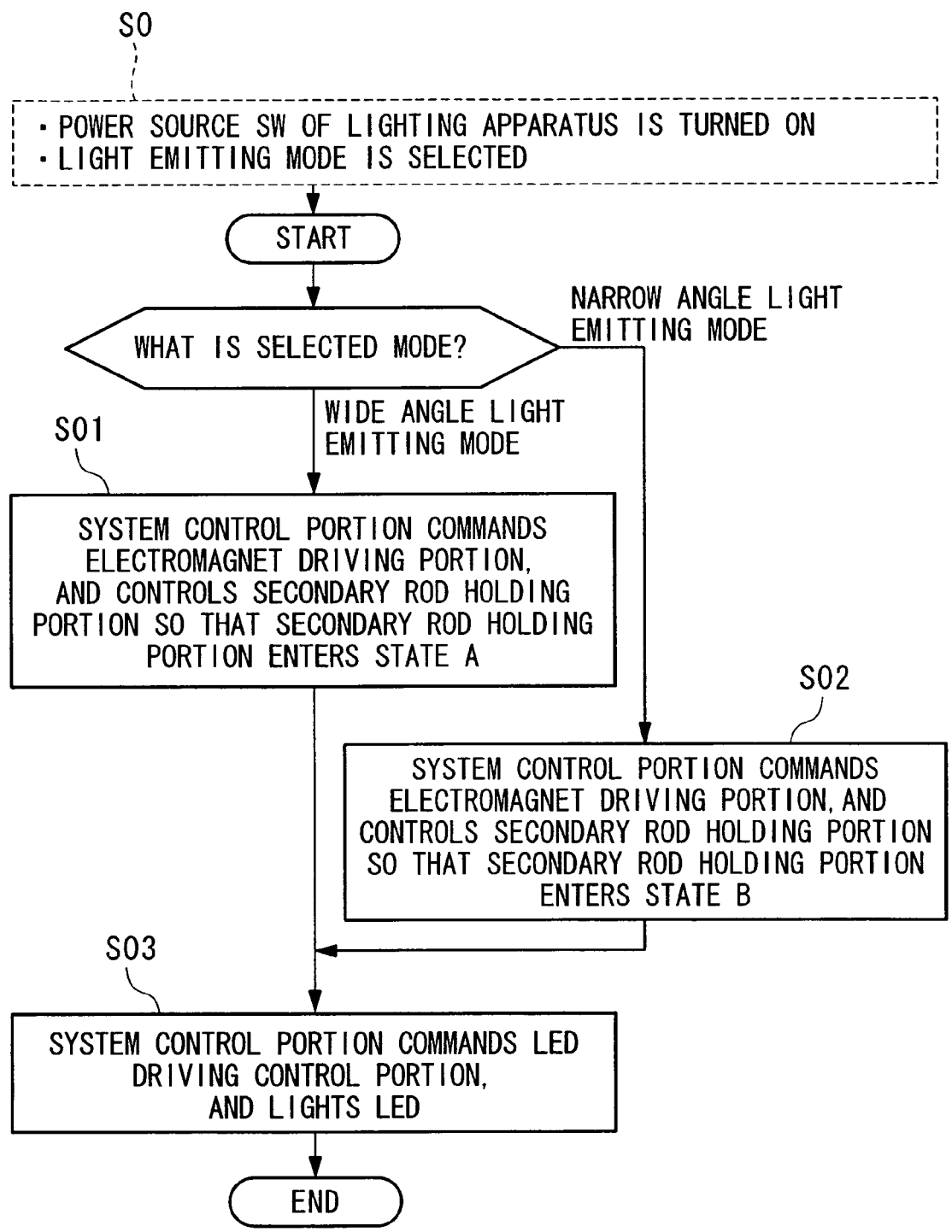
FIG. 5 is a flowchart view which shows the operation of the lighting apparatus according to the first embodiment of the present invention.

First, as shown in FIG. 5, as a preparation process (SO), the power source SW of the lighting apparatus 2 is turned on, and the light emitting mode is selected by the mode selection portion 10.

In this way, the lighting apparatus 2 is driven, and the main process is started.

First, the system control portion 11 confirms whether the selection mode is the narrow angle light emitting mode or the wide angle light emitting mode. In addition, here, although the operation of the lighting apparatus 2 for the red color is explained, regarding operation of the lighting apparatuses for the green color and the blue color which are not shown in the figures, the same operation is performed based on RGB time-sharing control of the system control portion 11.

When the wide angle light emitting mode SW 36 is used, and the wide angle light emitting mode is set, the separating process (S01) is performed. That is, the system control portion 11 commands the electromagnet driving portion 35 via the secondary rod contact/separation direction portion 38, and drives the electromagnet 34. At this time, the electromagnet 34 moves the secondary rod holding portion 30 in the direction in which the elastic body 31 is contracted, clearance is formed at the predetermined amount between the first side surface 23 of the main rod 17 and the second side surface 25 of the secondary rod 18, and the main rod 17 and the secondary rod 18 enter in the separated state A from each other as shown in FIGS. 2A and 2B.

Next, the lighting process (S03) is performed. That is, the system control portion 11 commands the LED driving control portion 13 via the LED light on/off direction portion 41, and turns on the LED 12.

The emitted light which is emitted from the LED 12 enters the light guiding body 16 at the one end surface 21 of the main rod 17, and proceeds in the direction of the other end surface 22 within the main rod 17.

Here, because the light of the LED enters the one end surface 21 in a diffused state, much light proceeds to the first side surface 23. At this time, because the clearance between the main rod 17 and the secondary rod 18 is formed, the emitted light does not enter the second side surface 25 of the secondary rod 18, and complete reflection of the emitted light is performed by the first side surface 23.

Figure 6A:
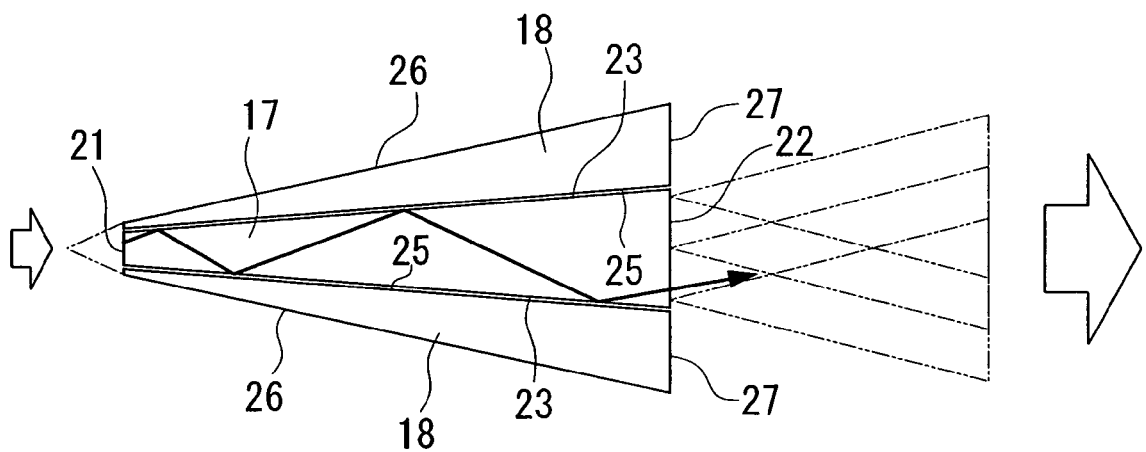
FIG. 6A is an explanation view which shows a state in a wide angle light emitting mode of a lighting apparatus and a light guiding apparatus according to the first embodiment of the present invention.

Thus, as shown in FIG. 6A, the emitted light is guided by the inside of the main rod 17, and is emitted from only the other end surface 22.

Then, the emitted light is modulated by the display device 3 which is illuminated by the light emitting optical portion 5 based on the input image, the image is projected on the screen 47 by the projection optical portion 6, and the performance is finished.

On the other hand, when the narrow light emitting mode SW 37 is operated, and the narrow light emitting mode is set, the contact process (S02), not the separating process (S01), is performed.

That is, the system control portion 11 commands the electromagnet driving portion 35 so that the electromagnet 34 is not driven. At this time, due to the pressing power of the elastic body 31, the secondary rod holding portion 30 is not moved, and the state B is formed as shown in FIGS. 3A and 3B in which the first side surface 23 of the main rod 17 and the second side surface 25 of the secondary rod 18 are in contract with each other.

Next, the lighting process (S03) is started, the system control portion 11 commands the LED driving control portion 13 via the LED light on/off direction portion 41, and the LED 12 is turned on.

The emitted light which is emitted from the LED 12 enters the one end surface 21 of the main rod 17 via the light guiding body 16, and proceeds in the direction of the other end surface 22 through the main rod 17.

The emitted light which proceeds in the direction of the first side surface 23 is transmitted through the first side surface 23, enters the second side surface 25 of the secondary rod 18, and is completely reflected by the third side surface 26. At this time, according to the reflection angles, the emitted light proceeds while separating into two components, that is, one component which proceeds through the inside of the secondary rod 18 as it is, and is emitted from the secondary rod light emitting end surface 27, and another component which enters the second side surface 25 and continues into the first side surface 23, proceeds through the inside of the main rod 17 again, and is emitted from the other end surface 22.

At this time, because an area ratio between the one end surface 21 and the total light emitting surface 28 is larger than an area ratio between the one end surface 21 and the other end surface 22, as compared with the case in which the light guiding is performed for only the main rod 17, NA (Numerical Aperture) becomes small, and the emitted light has a narrower angle.

Figure 6B:
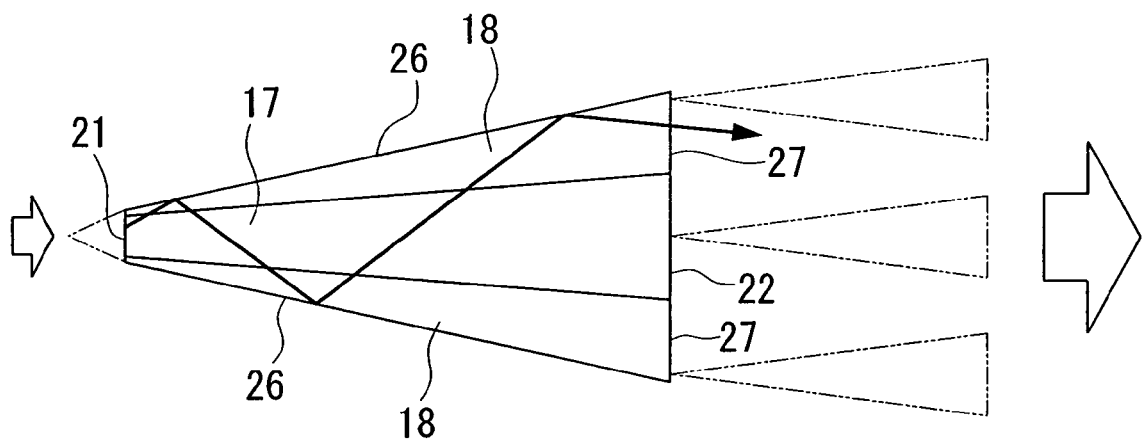
FIG. 6B is an explanation view which shows a state in a narrow angle light emitting mode of a lighting apparatus and a light guiding apparatus according to the first embodiment of the present invention.

Thus, as shown in FIG. 6B, the emitted light is emitted from the total light emitting surface 28 which is composed of the other end surface 22 and the secondary rod light emitting end surface 27 in a state in which spot-lighting ability thereof is high.

Then, the emitted light is modulated by the display device 3 which is illuminated by the light emitting optical portion 5, the image is projected on the screen 47 by the projection optical portion 6, and the performance is finished.

According to the light guiding apparatus 8, when the secondary rod 18 is separated from the main rod 17, all of emitted light which enters the one end surface 21 is reflected by the first side surface 23 of the main rod 17, and the emitted light can be led to the other end surface 22. On the other hand, when the secondary rod 18 is in contact with the main rod 17, the emitted light which enters the one end surface 21 enters from the first side surface 23 into the second side surface 25 and all of the emitted light is reflected by the third side surface 26, and the emitted light can be led to the other end surface 22.

In this case, because a plurality of parts of the secondary rod 18 are arranged in axial symmetry around the longitudinal axis X of the main rod 17, when the parts of the secondary rod 18 are in contact with the main rod 17, the second side surface 25 can be in contact with all of the first side surface 23, moreover, when the parts of the secondary rod 18 are separated from the main rod 17, the second side surface 25 can be separated from all of the first side surface 23.

Therefore, in the cases in which the secondary rod 18 is in contact with the main rod 17, and the secondary rod 18 is separated from the main rod 17, respectively, the emitted light can be emitted at diffusion angles which are distinctly different from each other.

Moreover, when the secondary rod 18 is in contact with the main rod 17, the emitted light can be emitted from the secondary rod light emitting end surface 27 of the secondary rod 18.

Therefore, in the cases in which the main rod 17 and the secondary rod 18 are in contact with each other, and the main rod 17 and the secondary rod 18 are separated from each other, the same quantity of light can be emitted, and in the case in which the main rod 17 and the secondary rod 18 are in contact with each other, a higher contrast of emitted light can be emitted than in the case in which the main rod 17 and the secondary rod 18 are separated from each other.

Furthermore, because both the first side surface 23 and the second side surface 25 are planar surfaces, when the secondary rod 18 is in contact with the main rod 17, the first side surface 23 and the second side surface 25 can be in contact with each other without nonuniformity, a more proper contact state can be maintained, and thereby the reflection on the first side surface can be properly decreased. In addition, in order for the contact properties between the first side surface 23 and the second side surface 25 to be more proper, a sheet material which is transparent and elastic may be provided.

Moreover, because, when the secondary rod 18 is separated from the main rod 17, the light emitting end surface is the other end surface 22 which has a shape similar to that of one end surface 21, and when the secondary rod 18 is in contact with the main rod 17, the light emitting end surface is the total light emitting surface 28 which has a shape similar to that of the one end surface 21, the effect of the emitted light having a difference of NA can be easily obtained.

Moreover, because indexes of refraction of the main rod 17 and the secondary rod 18 are the same, the light guiding can be performed between the main rod 17 and the secondary rod 18 without changing the propagation direction of the emitted light, and the emitted light can be emitted with the desirable NA.

Moreover, by ON/OFF switching of the electromagnet 34, the switching of contact/separation states between the secondary rod 18 and the main rod 17 can be easily performed.

Moreover, according to the present lighting apparatus 2, because the light guiding apparatus 8 according to the present invention is provided, by performing the mode switching by way of the mode selection portion 10, the secondary rod 18 can be put in contact with the main rod 17, or the secondary rod 18 can be separated from the main rod 17, and one of the wide angle lighting and the narrow angle lighting can be emitted.

Moreover, according to the present projector 1, because the lighting apparatus 2 according to the present invention is provided, by performing the mode switching, the secondary rod 18 can be put in contact with the main rod 17, or the secondary rod 18 can be separated from the main rod 17, and even if only one lighting apparatus is provided, emitted light which has two possible diffusion angles can be emitted into the display device 3. Therefore, projected images of which the contrast is different can be projected onto the screen 47.

Next, a modified example of the first embodiment is explained with reference to FIGS. 7A to 8B.

In this modified example, two parts of the secondary rod (two parts) 52 of which the shapes are rectangular prisms are arranged at both sides of the main rod 17 of which the shapes are rectangular prisms.

In the wide angle light emitting mode (the state A) shown in FIGS. 7A and 7B, the secondary rod 52 at both sides of the main rod 17 is not in contact with the main rod 17. In this case, the emitting surface is the emitting surface which has the aspect ratio of the emitting surface of the main rod 17, and the device is in the wide angle light emitting state.

On the other hand, in the narrow angle light emitting mode (state B) shown in FIGS. 8A and 8B, the parts of the secondary rod 52 at both sides of the main rod 17 are in contact with the main rod 17, and the combined emitting surface is formed. In this case, the emitting surface becomes the emitting surface of which the aspect ratio is in a wide state formed by the combined emitting surface, and becomes an emitting surface which is in the narrow angle light emitting state.

For example, when a standard aspect ratio which is usually 4:3 is needed, the state A is set. For example, when an aspect ratio which is 16:9 such as in high definition is needed, the state B is set, the aspect ratio becomes wide, and the contrast can be improved due to higher directivity of the emitted light.

Next, the second embodiment is explained with reference to FIGS. 9A to 12.

In addition, the same symbols are attached to the same constitutions as in the above-mentioned first embodiment, and explanation thereof is omitted.

The point of difference between the second embodiment and the first embodiment is that, on the secondary rod light emitting end surface 53 of the secondary rod 52 of the light guiding apparatus 51 of the lighting apparatus 50 according to the second embodiment, as shown in FIGS. 6A, 6B, 9A, and 9B, a light absorbing portion 55 which absorbs the emitted light is arranged, and the light guiding apparatus 51 is provided with a quantity of light detection portion 56 which detects the quantity of light of a part of the emitted light which reaches the light absorbing portion 55.

The quantity of light detection portion 56 is provided with a quantity of light sensor 57 which is arranged at a part of the light absorbing portion 55, and, as shown in FIGS. 10A and 10B, a quantity of light sensor driving portion 60 which drives the quantity of light sensor 57, and is connected to the system control portion 58.

Figure 11:
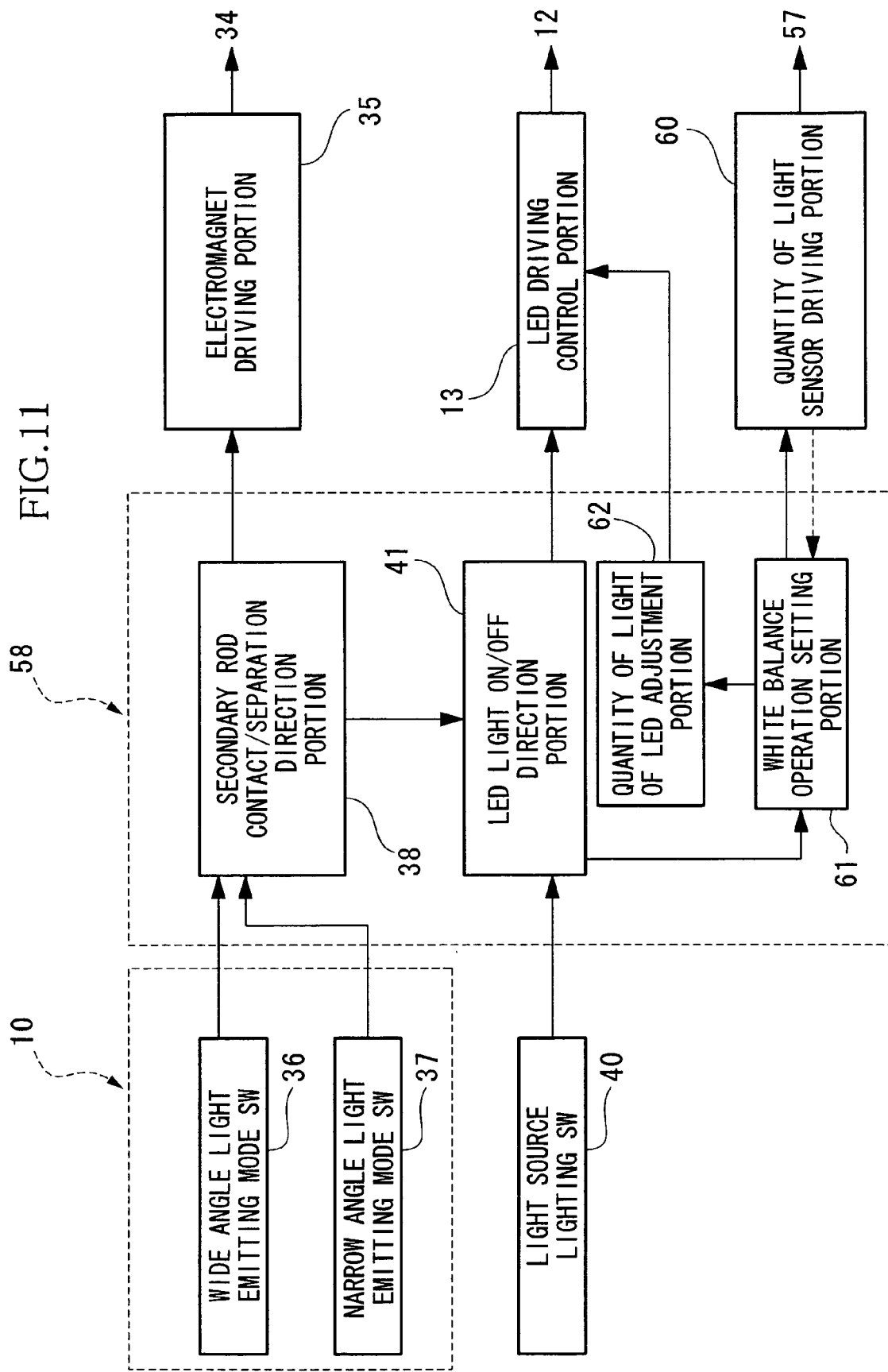
FIG. 11 is a block diagram which shows a function of the lighting apparatus according to the second embodiment of the present invention.

As shown in FIG. 11, the system control portion 58 is further provided with a white balance operation setting portion 61 which computes an adjusted quantity of light in order to set a white balance setting based on the quantity of light measured by the quantity of light sensor 57, and an LED quantity of light adjustment portion 62 which directs the LED driving control portion 13 in order to adjust the quantity of light emitted by the LED 12 based on the adjusted quantity of light.

Next, the operation methods of the lighting apparatus 50 and the light guiding apparatus 51 according to the present embodiment, and the function and the effect thereof are explained.

Figure 12:
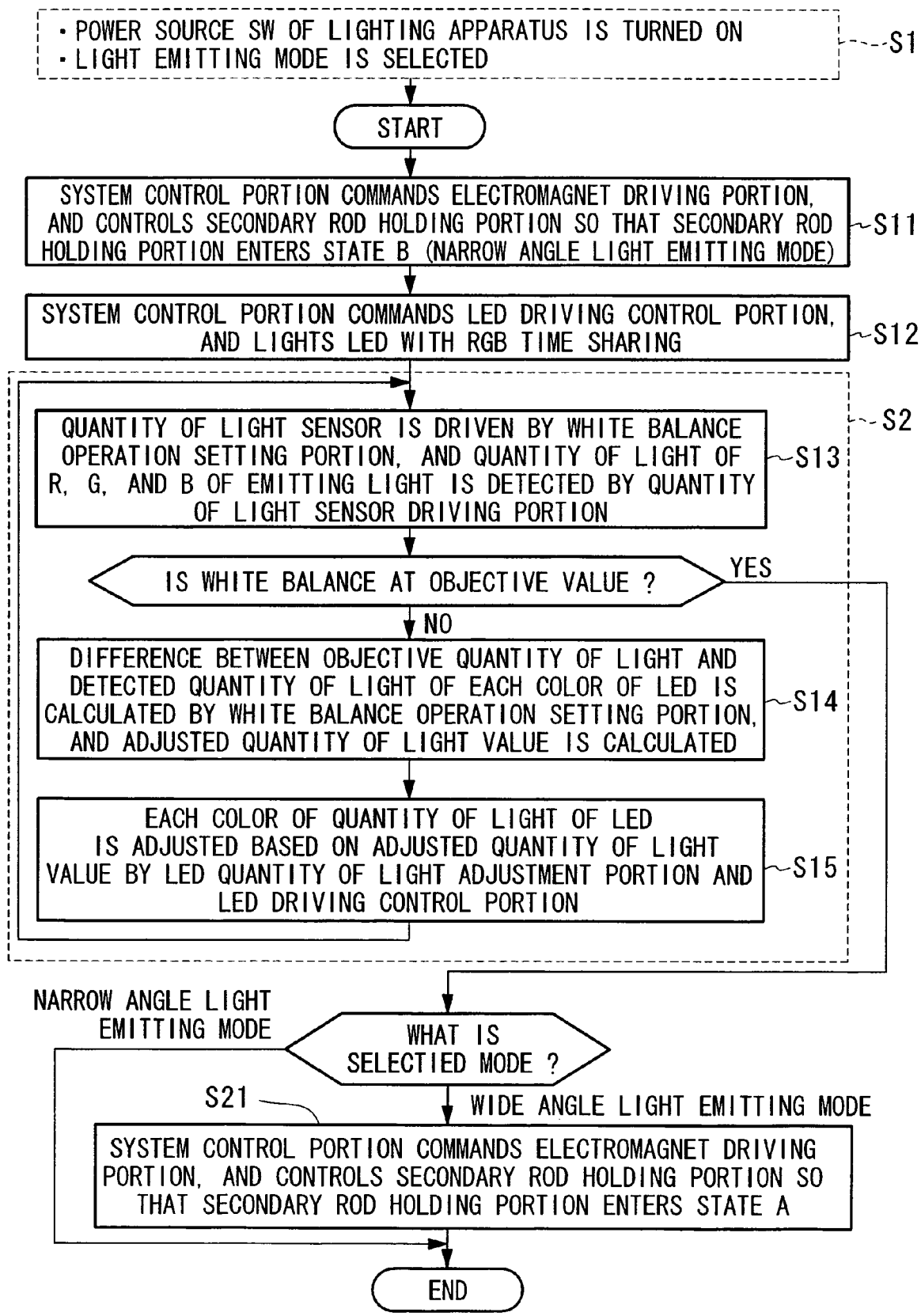
FIG. 12 is a flowchart view which shows the operation of the lighting apparatus according to the second embodiment of the present invention.

First, as shown in FIG. 12, as the preparation process (S1), the power source SW of the lighting apparatus 50 is turned on, and the light emitting mode is selected at the mode selection portion 10.

Here, before the light emitting mode is put into effect, the white balance adjustment process (S2) is performed. Therefore, the light emitting mode is set to the narrow angle light emitting mode, and the contact process (S11) is performed. That is, the state. B which is shown in FIGS. 9A and 9B is set, which is the state in which, without driving the electromagnet 34, the secondary rod 52 is in contact with the main rod 17.

Next, the lighting process (S12) is started. That is, the system control portion 58 commands each LED driving control portion 13 according to not only the red color of lighting apparatus 50 but also the green color and the blue color of the lighting apparatuses which are not shown in the figures, and turns on the LED 12 so that RGB time-sharing is performed.

A part of the emitted light which is emitted from the LED 12 is guided to the secondary rod light emitting end surface 53 by the same function as in the case of the narrow angle light emitting mode according to the first embodiment. Here, because the light is absorbed by the light absorbing portion 55, although the emitted light is not emitted from the secondary rod light emitting end surface 53, a part of the emitted light is guided to the quantity of light sensor 57.

Next, the white balance adjustment process (S2) is performed.

First, as the quantity of light detection process (S13), the white balance operation setting portion 61 commands the quantity of light sensor driving portion 60, the quantity of light sensor is driven, and the quantity of light of each of RGB of the emitted light is detected.

The selection of the light emitting mode is performed in the case in which the result of the white balance compared to the detection result matches an objective value. If the narrow angle light emitting mode is to be performed, the present state is maintained. On the other hand, if the wide angle light emitting mode is to be performed, the separating process (S21) is started, and then light emitting according to the proper light emitting mode is performed in the same manner as in the first embodiment.

When the white balance is outside of the objective value, an adjusted quantity of light calculation process (S14) is started. That is, by the white balance operation setting portion 61, the adjusted quantity of light is calculated according to the difference between the objective quantity of light and the detected quantity of light of each color of LED 12.

Then, a quantity of light adjustment process (S15) is started, the LED driving control portion 13 is commanded with the assistance of the LED quantity of light adjustment portion 62, the driving electrical current of each LED 12 is adjusted based on the adjusted quantity of light value which is calculated, and thereby the adjustment of the quantity of light is performed.

Next, the detection process (S13) is performed, the quantity of light is detected by the quantity of light sensor 57, and again, the white balance adjustment process (S2) is repeated until the quantity of light becomes the white balance objective value.

According to the lighting apparatus 50 and the light guiding apparatus 51, because the emitting of the emitted light from the secondary rod light emitting end surface 53 is regulated, regardless of the contact state or separation state of the main rod 17 and the secondary rod 52, the emitted light can be emitted from only the other end surface 22, and even though emitted light of which the diffusion angle varies is emitted, a constant light emitting area can be maintained.

Moreover, when the secondary rod 52 is in contact with the main rod 17, the quantity of light of the emitted light which is guided to the secondary rod light emitting end surface 53 can be detected by the quantity of light detection portion 56, and the quantity of light of the LED 12 can be changed according to the detection result, and can be adjusted to the predetermined quantity of light.

Next, the third embodiment is explained with reference to FIGS. 13A, 13B, 13C, 14A, 14B, and 14C.

In addition, the same symbols are attached to the same constitutions as in the above-mentioned other embodiment, and explanation thereof is omitted.

The point of difference between the third embodiment and the second embodiment is that, on the secondary rod light emitting end surface 68 of the secondary rod 67 of the light guiding apparatus 66 of the lighting apparatus 65 according to the present embodiment, light reflection portion 70 which reflects all of emitted light is arranged, and, on the end surface 71 of the secondary rod 67 near the one end surface 21, a second light reflection portion 72 which is approximately parallel to the secondary rod light emitting end surface 68, and reflects all of emitted light is arranged.

In the lighting apparatus 65 and the light guiding apparatus 66, the same operation as in the second embodiment is performed.

That is, in the wide angle light emitting mode, because the secondary rod 67 is in the state in which the secondary rod 67 is separated from the main rod 17, by the same function as in each embodiment, the emitted light is emitted from only the other end surface 22 of the main rod 17.

On the other hand, when the narrow angle light emitting mode is selected, the emitted light is emitted from the LED 12 in the state in which the secondary rod 67 is in contact with the main rod 17.

At this time, all of emitted light which enters the second side surface 25 of the secondary rod 67 from the first side surface 23 of the main rod 17 is reflected by the third side surface 26, and is guided to the main rod 17 again, or to the secondary rod light emitting end surface 68.

Here, all of emitted light which is guided to the secondary rod light emitting end surface 68 is reflected by the light reflection portion 70, and proceeds to the one end surface 21 side. Furthermore, then, all of emitted light which is guided to the end surface 71 at the one end surface 21 side of the secondary rod 67 is reflected by the second light reflection portion 72, and is guided to the other end surface 22 side, again.

According to the lighting apparatus 65 and the light guiding apparatus 66, the emitted light which is reflected toward the one end surface 21 side by the light reflection portion 70 can be reflected by the second light reflection portion 72, again. Therefore, the emitted light which is guided within the secondary rod 67, and reaches the secondary rod light emitting end surface 68 is not wasted, and can be emitted from the other end surface 22, and the quantity of emitted light can be increased compared with in the case of the second embodiment.

Next, the fourth embodiment is explained with reference to FIGS. 15 to 17.

In addition, the same symbols are attached to the same constitutions as in the above-mentioned other embodiment, and explanation thereof is omitted.

Figure 15:
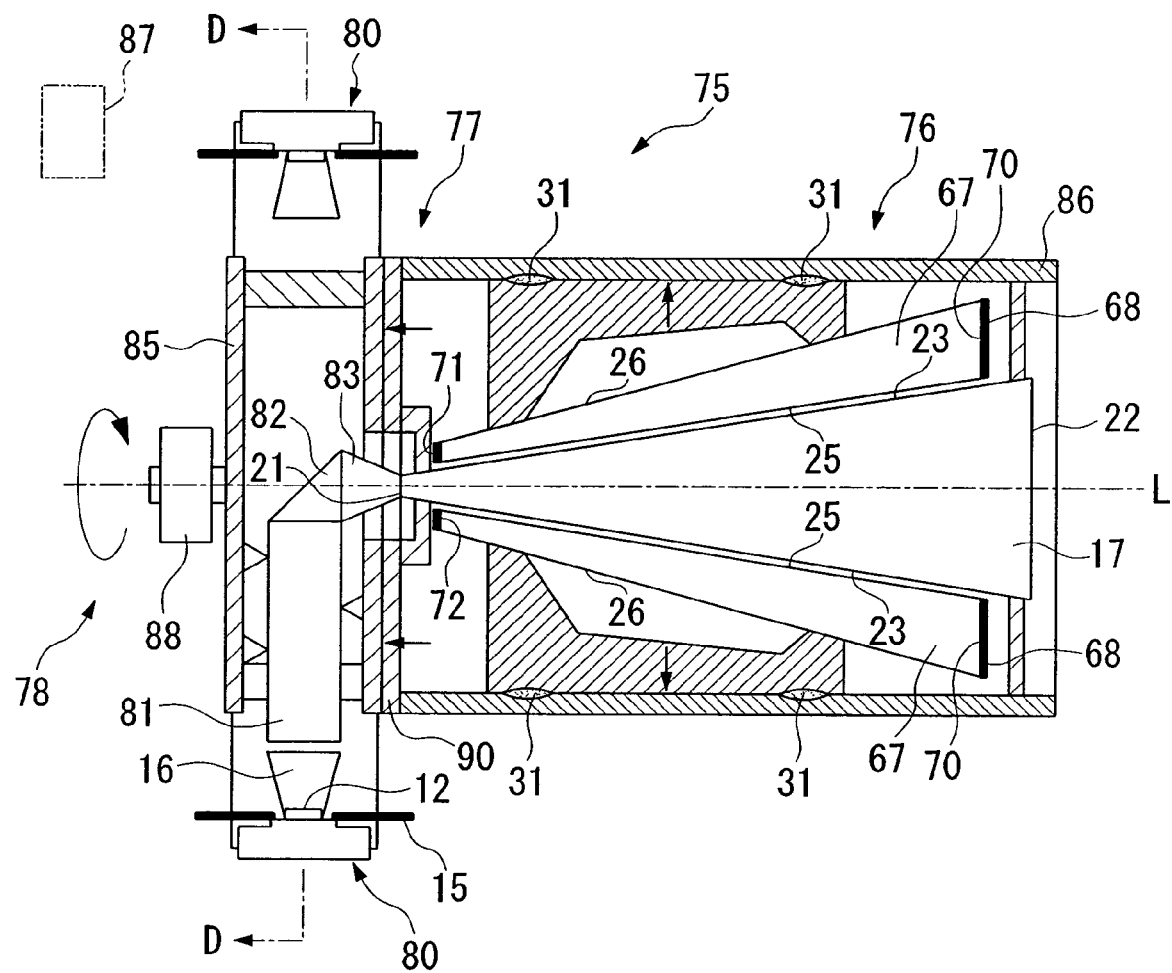
FIG. 15 is a cross-sectional view which shows a state in a wide angle light emitting mode of the lighting apparatus and the light guiding apparatus according to the fourth embodiment of the present invention.
Figure 16:
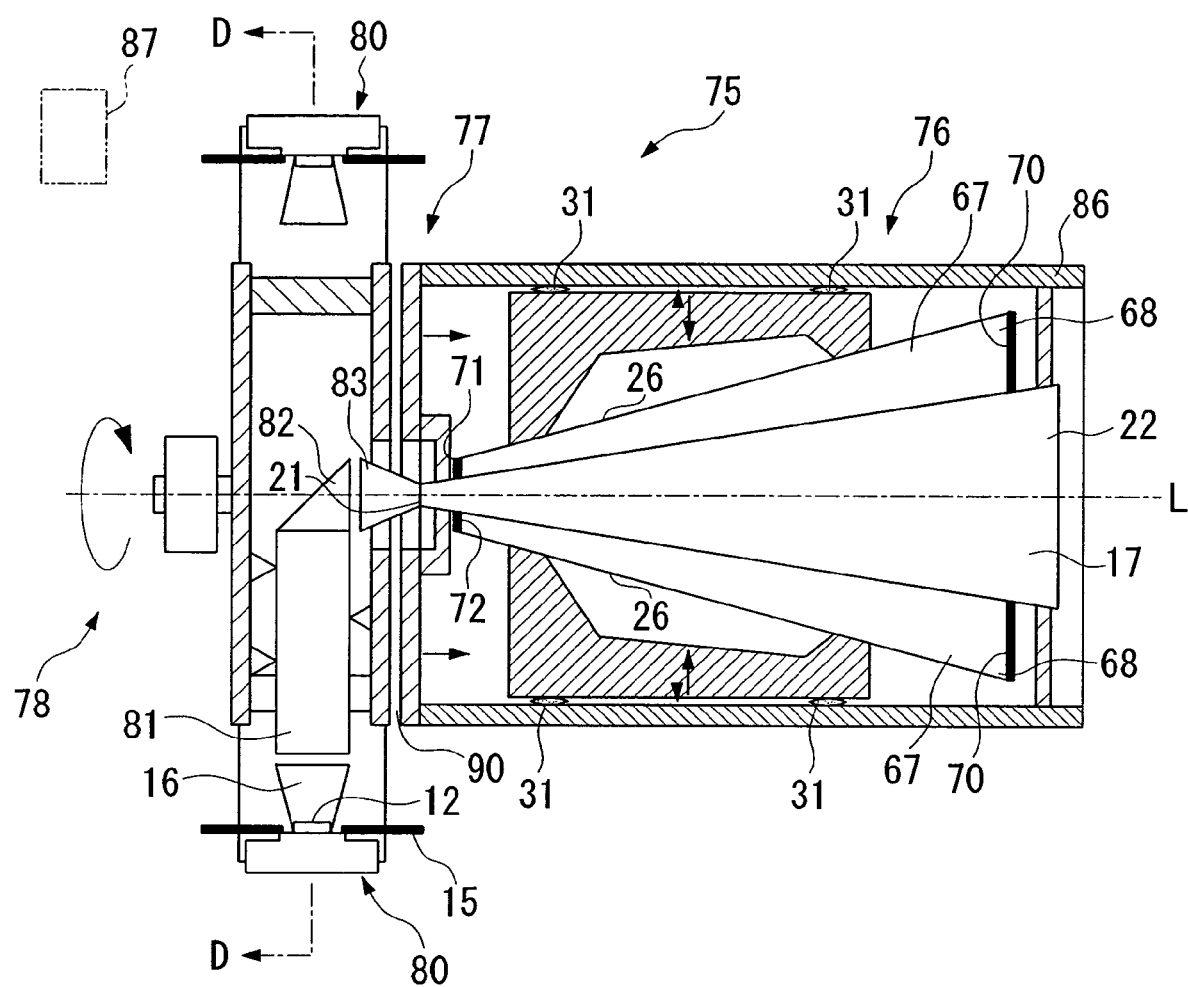
FIG. 16 is a cross-sectional view which shows a state in a narrow angle light emitting mode of the lighting apparatus and the light guiding apparatus according to the fourth embodiment of the present invention.

The point of difference between the fourth embodiment and the third embodiment is that, as shown in FIGS. 15 and 16, the separation portion 77 of the light guiding apparatus 76 of the lighting apparatus 75 according to the present embodiment is provided with a rotation portion 78 which rotates the main rod 17 and the secondary rod 67 about a rotation axis of a normal line L which passes through the center of the other end surface 22, and generates greater centrifugal force than the pressing power of the elastic body 31 on the secondary rod 67.

Figure 17:
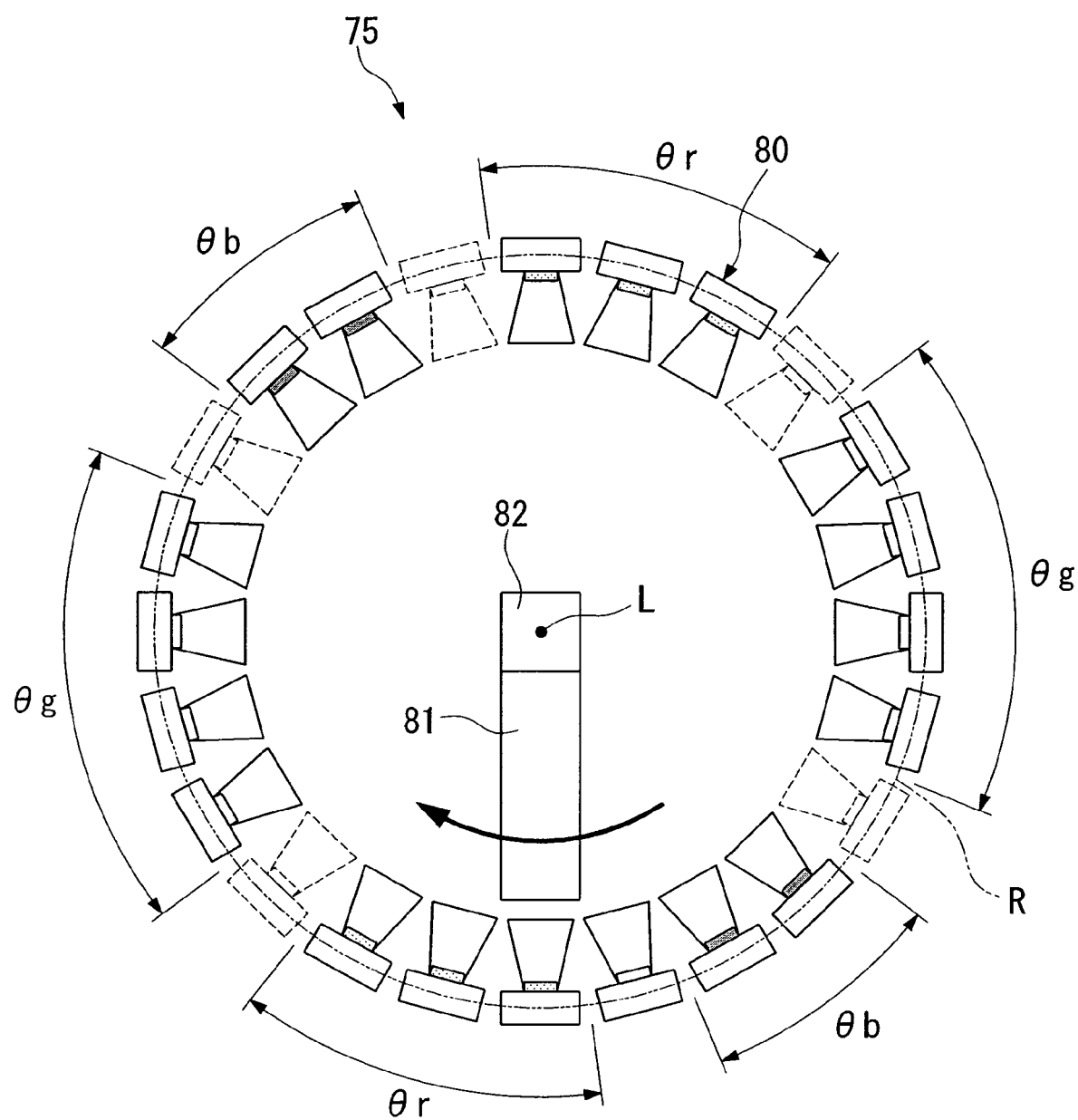
FIG. 17 is a view seen from the arrow D of FIG. 15 and FIG. 16.

As shown in FIG. 17, the lighting apparatus 75 is provided with a plurality of each of red color, green color, and blue color light source portions 80 which are arranged on the circumference of a circle R with the central axis of the normal line L at predetermined angle ranges while making the light guiding body 16 face the central portion of the circle, a light guiding rod 81 which has a surface facing the light guiding body 16, and guides the emitted light emitted from the LED 12 in the direction of the center of the circle R, the prism 82 which changes the direction of the emitted light which is guided to the central position of the circle R to the one end surface 21 side, a reverse taper rod 83 which is connected to one end surface 21 in order to transmit the emitted light sent from the prism 82 into the one end surface 21 without leakage, and a rotation base 85 which supports the light guiding rod 81 and the prism 82.

Here, because the light reflection portion 70 is arranged at the secondary rod light emitting end surface 68 of the secondary rod 67, when forming the other end surface 22, it is not necessary for the total light emitting surface to be formed, and a part of the outer frame 86 is extended near the other end surface 22 of the main rod 17, and directly supports it.

The rotation portion 78 is provided with a rotation motor which is driven and is controlled by the system control portion 87, is connected to the rotation base 85, and gives a rotation power to the rotation base 85, and a electric clutch 90 which makes the rotation base 85 and the outer frame 86 connect to each other or separate from each other.

When the rotation base 85 and the outer frame 86 are connected to each other by the electric clutch 90, the prism 82 and the reverse taper rod 83 are arranged at the position in which the prism 82 and the reverse taper rod 83 are in contact with each other.

Figure 18:
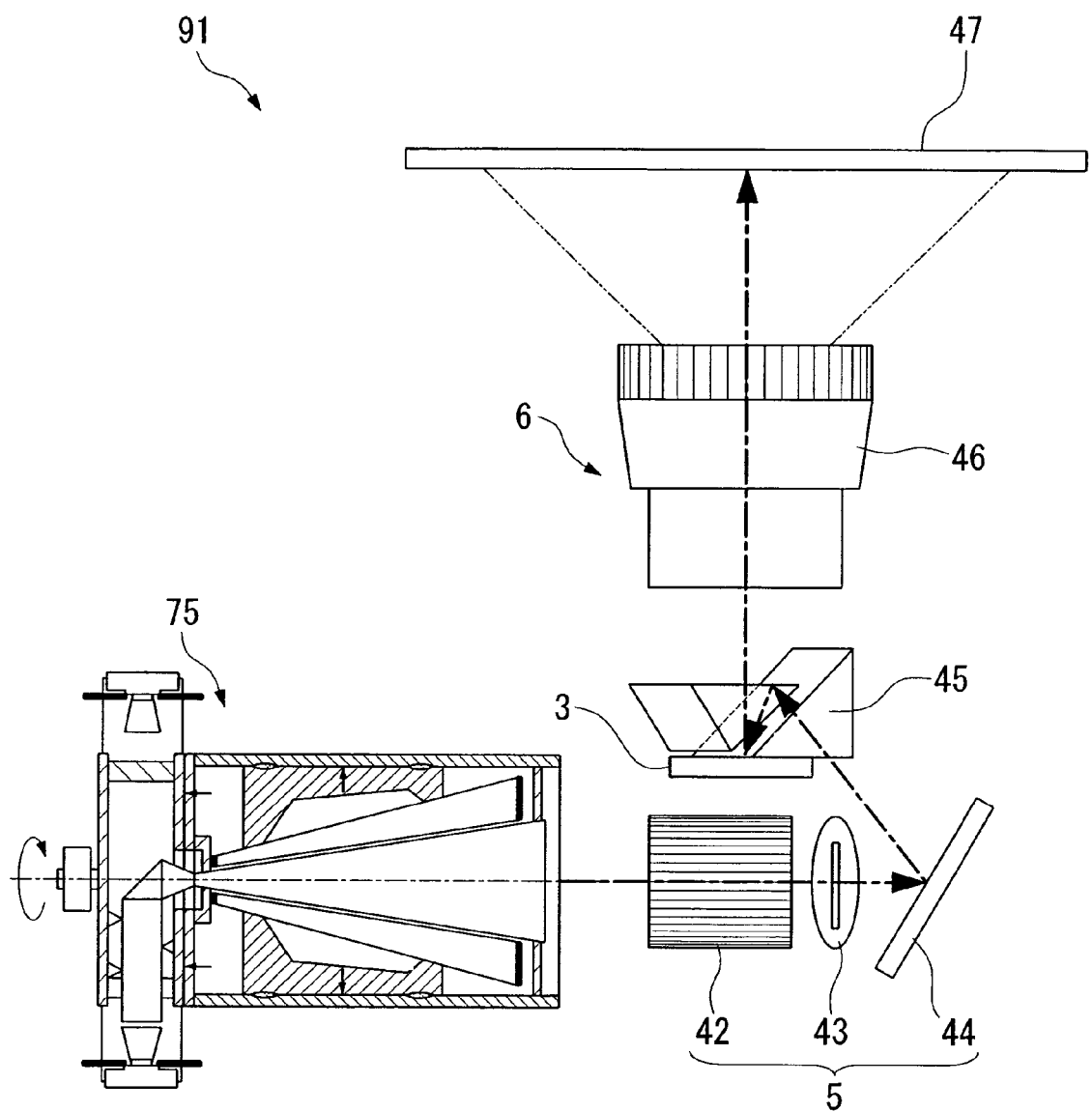
FIG. 18 is a schematic construction view of a projector according to a fourth embodiment of the present invention.

In addition, in the projector 91 according to the present embodiment, as shown in FIG. 18, the lighting apparatus 75 is arranged so that the other end surface 22 and a relay lens 42 face each other.

Next, the operation methods of the lighting apparatus 75 and the light guiding apparatus 76 according to the present embodiment, and the function and the effects thereof are explained.

When light emitting according to the lighting apparatus 75 according to the present embodiment is performed, first, the power source SW of the lighting apparatus 75 is turned on, and the lighting mode is selected by the mode selection portion 10.

When the wide angle light emitting mode is set by operating the wide angle light emitting mode SW 36, the electric clutch 90 is driven by a command from the system control portion 87, and the rotation base 85 and the outer frame 86 are connected to each other.

In this state, the rotation motor 88 is rotated, the light guiding rod 81 and the prism 82 are rotated at the predetermined velocity with the rotation base 85, and simultaneously, the LEDs 12 having predetermined colors are turned on or off while being synchronized with the timing of the rotation.

At this time, because the outer frame 86 rotates with the rotation base 85, both the main rod 17 and the secondary rod 67 rotate about the normal line L. In this case, by the centrifugal force which is generated by the rotation, the secondary rod 67 is separated from the main rod 17 while compressing the elastic body 31.

In this state, the emitted light which enters from the one end surface 21 is guided within the main rod 17 by the same function as in the other embodiments, and is emitted from the other end surface 22.

On the other hand, when the narrow angle light emitting mode SW 37 is operated, and the narrow angle light emitting mode is set, by a command from the system control portion 87, the electric clutch 90 is reversed and the rotation base 85 and the outer frame 86 are separated from each other.

In this state, the rotation motor 88 is rotated, but only the rotation base 85 is rotated at the predetermined velocity, and simultaneously, the LEDs 12 having predetermined colors are turned on or off while being synchronized with the timing of the rotation.

At this time, because the outer frame 86 is not rotated, the main rod 17 and the secondary rod 67 are not rotated. Therefore, centrifugal force is not applied to the secondary rod 67, and by the pressing power of the elastic body 31, the state in which the secondary rod 67 is in contact with the main rod 17 is maintained.

In this state, the emitted light which enters from the one end surface 21 is guided within the main rod 17 and the secondary rod 67 by the same function as in the third embodiment, and all of a part of the emitted light is reflected by the light reflection portion 70 and the second light reflection portion 72, and is emitted from the other end surface 22.

According to the lighting apparatus 75 and the light guiding apparatus 76, when the light emitting is performed by a light emitting method using RGB time sharing, the rotation power of the rotation motor 88 is used for the main rod 17 and the secondary rod 67, by rotating the main rod 17 and the secondary rod 67, and instead of a contact/separation mechanism of an electromagnet, or the like, centrifugal force is generated on the secondary rod 67, and the secondary rod 67 can be easily separated from the main rod 17.

Next, the fifth embodiment is explained with reference to FIGS. 19 and 20.

In addition, the same symbols are attached to the same constitutions as in the above-mentioned other embodiments, and explanation thereof is omitted.

The point of difference between the fifth embodiment and the third embodiment is that, on one end surface 98 of the main rod 97 of the light guiding apparatus 96 of the lighting apparatus 95 according to the present embodiment, first light reflection portion 100 which reflects all of emitted light within the main rod 97, and is approximately parallel to the other end surface 22 is arranged.

Moreover, a reflection body 102 which has a mirror surface (reflection surface) 101 by which the emitted light emitted from the LED 12 is once reflected, and enters the main rod 97, is connected to the outside of the one end surface 98, and a cone shaped reflection mirror 103 which covers the LED 12 and the reflection body 102 is arranged at the outside of the one end surface 98. The inner circumference surface of the reflection mirror 103 is also formed as a mirror surface 101.

The reflection body 102 and the reflection mirror 103 are arranged instead of the light guiding body 16 in the light source portion 7 according to the other embodiment.

The emitted light which is reflected by the mirror surfaces 101 of the reflection body 102 and the reflection mirror 103 enters the inside of the main rod 97 from a part of the first side surface 104 which is the entry surface.

Next, the operation methods of the lighting apparatus 95 and the light guiding apparatus 96 according to the present embodiment, and the function and the effects thereof are explained.

First, the emitted light is emitted from the LED 12 by the same operation as in the third embodiment. At this time, regardless of the wide angle light emitting mode shown in FIG. 19, or the narrow angle light emitting mode shown in FIG. 20, the emitted light which is emitted is reflected by the mirror surfaces 101 of the reflection body 102 and the reflection mirror 103, and is guided to the inside of the main rod 97 from a part of the first side surface 104.

Figure 19:
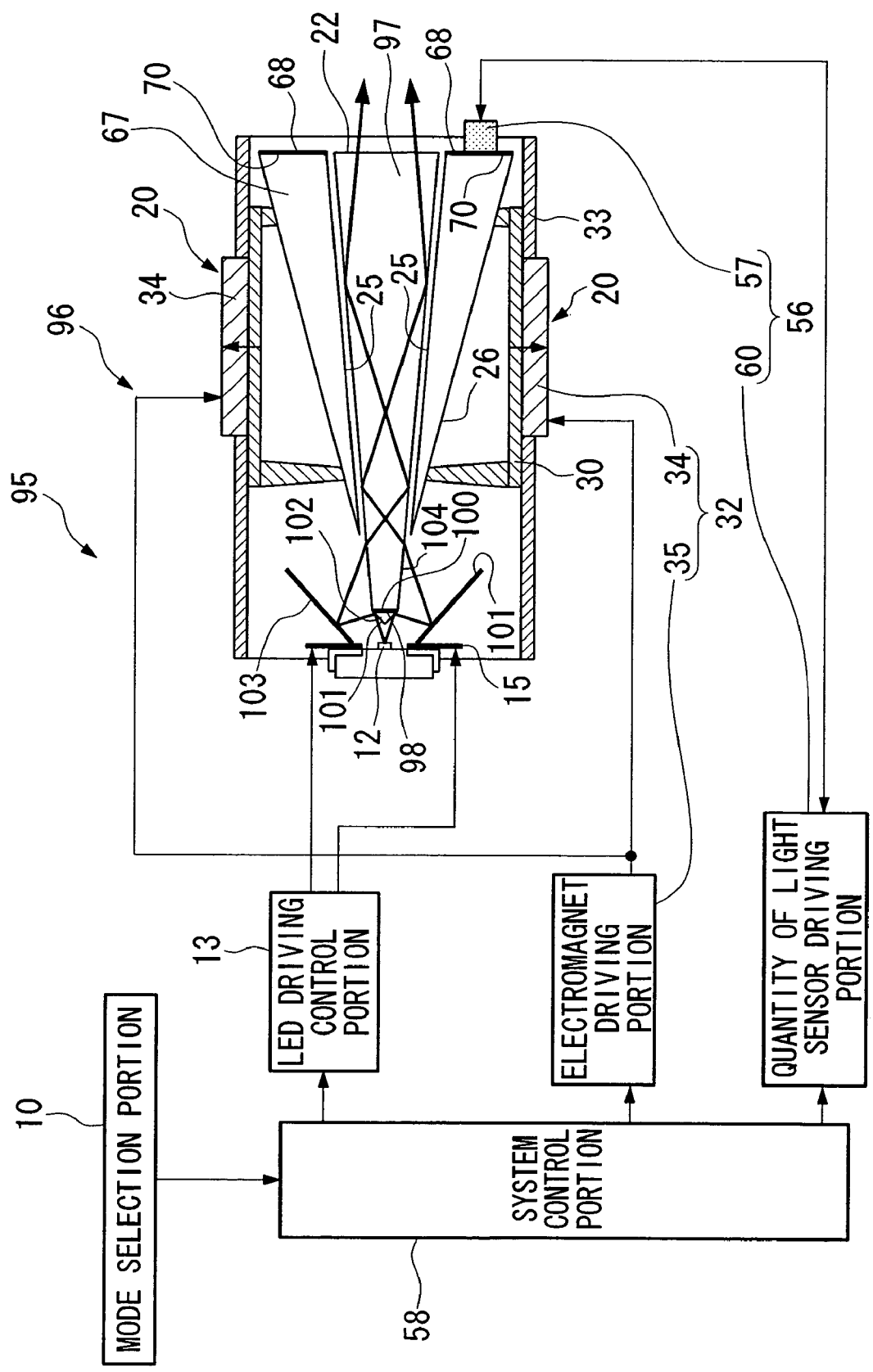
FIG. 19 is a cross-sectional view which shows a state in a wide angle light emitting mode of the lighting apparatus and the light guiding apparatus according to the fifth embodiment of the present invention.

In the case of the wide angle light emitting mode shown in FIG. 19, because the secondary rod 67 is in the state in which the secondary rod 67 is separated from the main rod 97, all of emitted light which enters the inside of the main rod 97 is reflected by the first side surface 104, is led to the other end surface 22, and is emitted.

Figure 20:
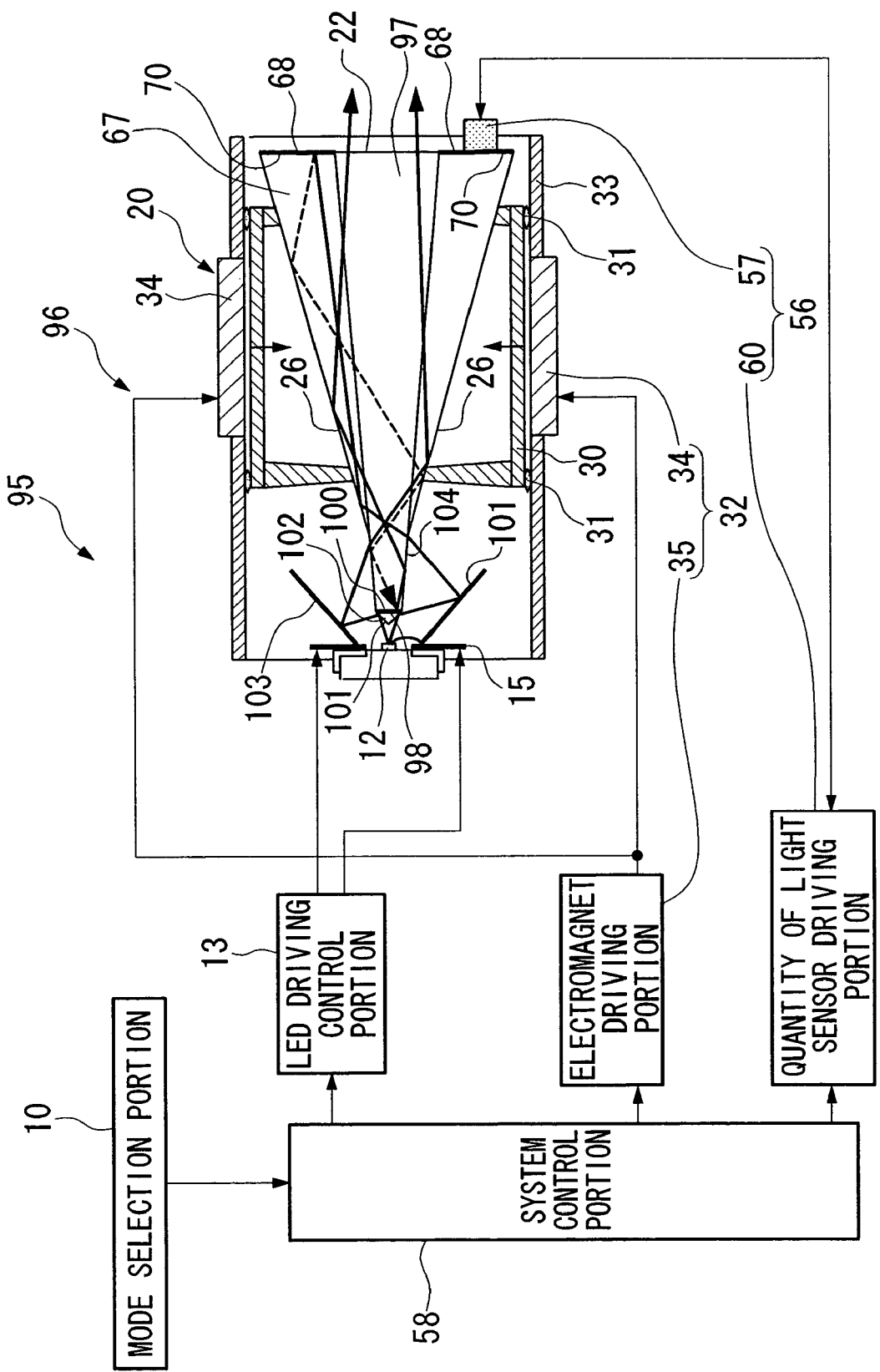
FIG. 20 is a cross-sectional view which shows a state in a narrow angle light emitting mode of the lighting apparatus and the light guiding apparatus according to the fifth embodiment of the present invention.

On the other hand, in the case of the narrow angle light emitting mode shown in FIG. 20, all of emitted light which enters from the first side surface 104 of the main rod 97 via the second side surface 25 into the inside of the secondary rod 67 is reflected by the third side surface 26, and a part thereof is guided to the secondary rod light emitting end surface 68. Furthermore, a further part of the emitted light which is reflected by the light reflection portion 70, and of which the propagation direction is changed is guided from the second side surface 25 via the first side surface 104 into the inside of the main rod 97.

When the emitted light reaches the one end surface 98, the emitted light is reflected by the first light reflection portion 100, and is guided toward the other end surface 22, again.

Thus, the emitted light which is reflected by the light reflection portion 70 can be also emitted from the other end surface 22.

According to the lighting apparatus 95 and the light guiding apparatus 96, the emitted light enters from the first side surface 104 in the state in which the secondary rod 67 is in contact with the main rod 97, and even if the emitted light is reflected by the light reflection portion 70, and is returned to the other end surface 98 side, the propagation direction of the emitted light can be changed toward the other end surface 22 side again by the first light reflection portion 100. Therefore, the reuse rate of the emitted light which enters into the main rod 97 can be increased.

Moreover, by reflecting the emitted light from the LED 12 by using the mirror surfaces 101, the emitted light can be efficiently transmitted into the main rod 97.

Figure 21:
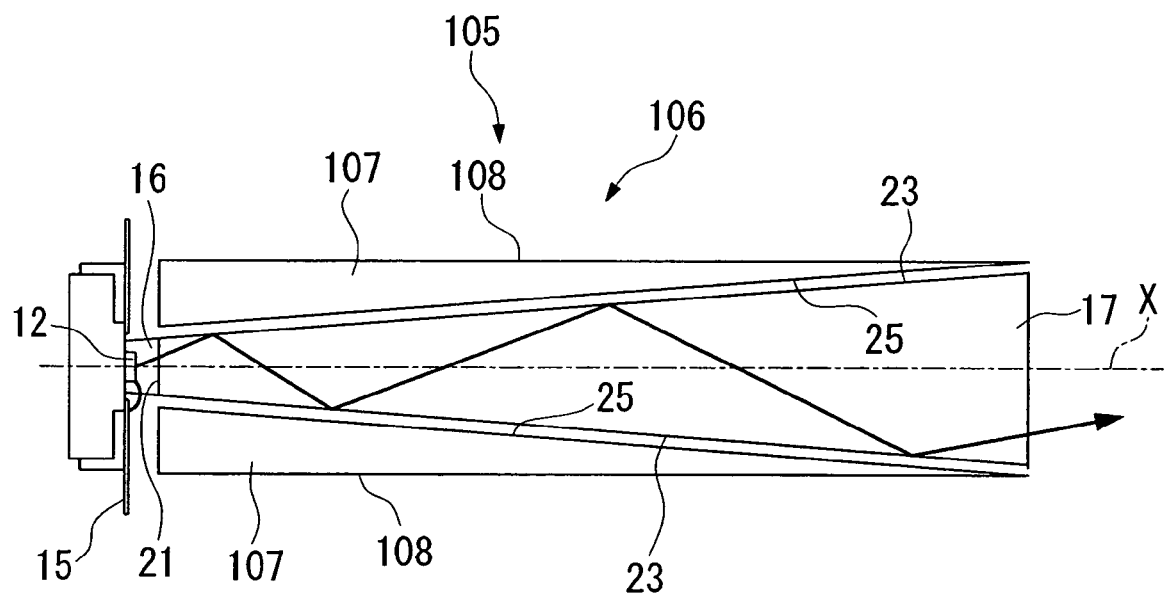
FIG. 21 is an explanation view which shows a narrow angle light emitting mode of a lighting apparatus and a light guiding apparatus according to the sixth embodiment of the present invention.

Next, the sixth embodiment is explained with reference to FIG. 21.

In addition, the same symbols are attached to the same constitutions as in the above-mentioned other embodiment, and explanation thereof is omitted.

The point of difference between the sixth embodiment and the third embodiment is that, in the light guiding apparatus 106 of the lighting apparatus 105 according to the present embodiment, when a profile of the main rod 17 viewed perpendicularly to the direction of the longitudinal axis X of the main rod 17 is the first profile, a cross-section of the first profile is formed so that the cross-section gradual enlarges from the one end surface 21 side to the other end surface 22 side, and when a profile of the secondary rod 107 viewed perpendicularly to the direction of the longitudinal axis X of the main rod 17 is the second profile, a cross-section of the second profile is formed so that the cross-section gradually gets smaller from the one end surface 21 side to the other end surface 22 side of the main rod 17, and a cross-section of a total profile which is composed of the first profile and the second profile which is formed when the secondary rod 107 is in contact with the main rod 17 is approximately the same at unprescribed positions in the direction of the longitudinal axis X.

That is, in the state in which the secondary rod 67 is in contact with the main rod 17, the parts of the third side surface 108 which are positioned in axial symmetry are planar surfaces run in the same direction.

When light emitting is performed by the lighting apparatus 105, the emitted light which enters into the inside of the main rod 17 from the one end surface 21 in the state in which the secondary rod 107 is in contact with the main rod 17 enters from the first side surface 23 via the second side surface 25 into the inside of the secondary rod 107, and all of the emitted light is reflected by the third side surface 108. At this time, because the third side surface 108 is parallel to the longitudinal axis X, the NA is not changed. Therefore, the emitted light is emitted from the other end surface 22 at a uniform diffusion angle at the time of emission.

On the other hand, all of emitted light which enters the inside of the main rod 17 from the one end surface 21 in the state in which the secondary rod 107 is separated from the main rod 17 is reflected by the first side surface 23, and is guided to the other end surface 22. At this time, because the cross-section of the other end surface 22 is larger than the cross-section of the one end surface 21 of the main rod 17, the NA becomes small. Therefore, the diffusion angle of the emitted light at the time of entering is smaller than that of the emitted light at the time of emitting.

Thus, in the lighting apparatus 105 and the light guiding apparatus 106 according to the present embodiment, the state in which the main rod 17 and the secondary rod 107 are in contact with each other is the wide angle light emitting mode, and the state in which the main rod 17 and the secondary rod 107 are separated from each other is the narrow angle light emitting mode, and the above state is contrary to the state of the other embodiments.

According to the lighting apparatus 105 and the light guiding apparatus 106, in the state in which the secondary rod 107 and the main rod 17 are in contact with each other, the emitted light can be emitted without changing the diffusion angle of the emitted light. Moreover, in the state in which the secondary rod 107 is separated from the main rod 17, the emitting beam of the emitted light is approximately the same state as in the state at the time of contacting, the diffusion angle of the emitted light is increased, and light emitting can be performed. Therefore, in a case in which a large size of area of the total light emitting surface cannot be secured, the wide angle light emitting and the narrow angle light emitting can be performed.

Figure 22:
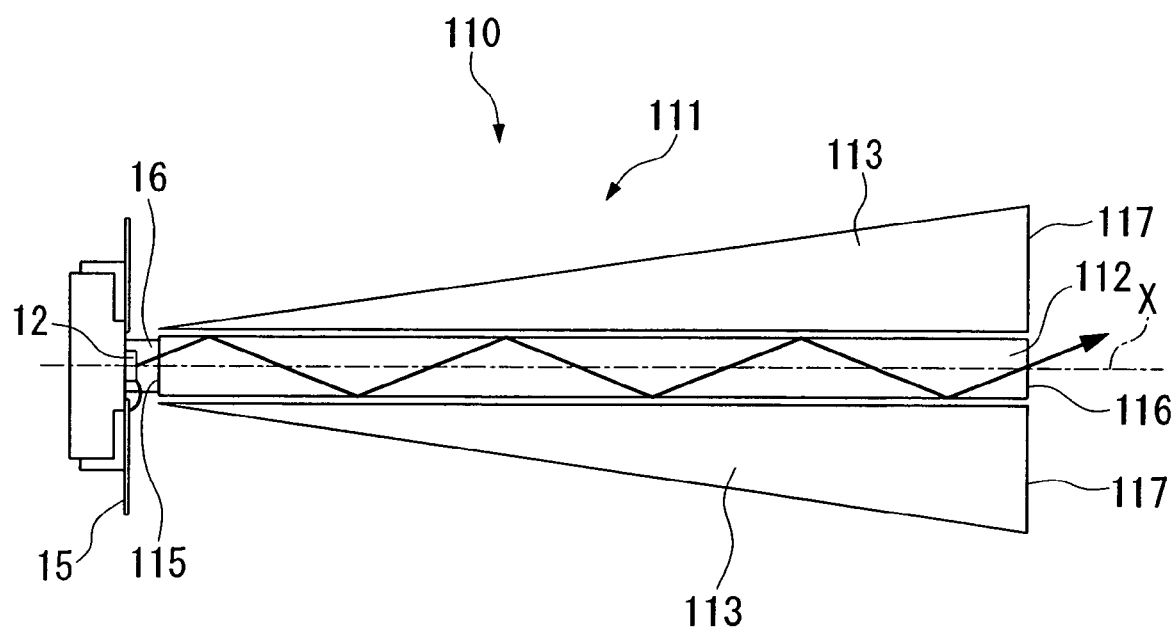
FIG. 22 is an explanation view which shows a wide angle light emitting mode of a lighting apparatus and a light guiding apparatus according to the seventh embodiment of the present invention.

Next, the seventh embodiment is explained with reference to FIG. 22.

In addition, the same symbols are attached to the same constitutions as in the above-mentioned other embodiments, and explanation thereof is omitted.

The point of difference between the seventh embodiment and the first embodiment is that, in the light guiding apparatus 111 of the lighting apparatus 110 according to the present embodiment, when a profile of the main rod 112 viewed perpendicularly to the direction of the longitudinal axis X of the main rod 112 is a first profile, a cross-section of the first profile is approximately the same at unprescribed positions in the direction of the longitudinal axis X, and when a profile of the secondary rod 113 viewed perpendicularly to the direction of the longitudinal axis X of the main rod 112 is a second profile, a cross-section of the second profile gradually enlarges from the one end surface 115 side of the main rod 112 to the other end surface 116 side.

According to the lighting apparatus 110 and the light guiding apparatus 111, by the same operation as in that of the first embodiment, the same functions and effects as those of the first embodiment can be obtained. In this case, in the narrow angle light emitting mode which is the state in which the secondary rod 113 is in contact with the main rod 112, the emitted light can be emitted from the other end surface 116 of the main rod 112 and the secondary rod light emitting end surface 117, and thereby the emitted beam of the emitted light can become wide, and the diffusion angle can become small. Moreover, in the wide angle light emitting mode which is the state in which the secondary rod 113 is separated from the main rod 112, because the emitted light is guided within only the main rod 112, without changing the diffusion angle of the emitted light, the emitted beam can be narrower than in the case of the contact state.

Next, the eighth embodiment is explained with reference to FIGS. 23A, 23B, and 23C.

In addition, the same symbols are attached to the same constitutions as in the above-mentioned other embodiments, and explanation thereof is omitted.

Figure 23A:
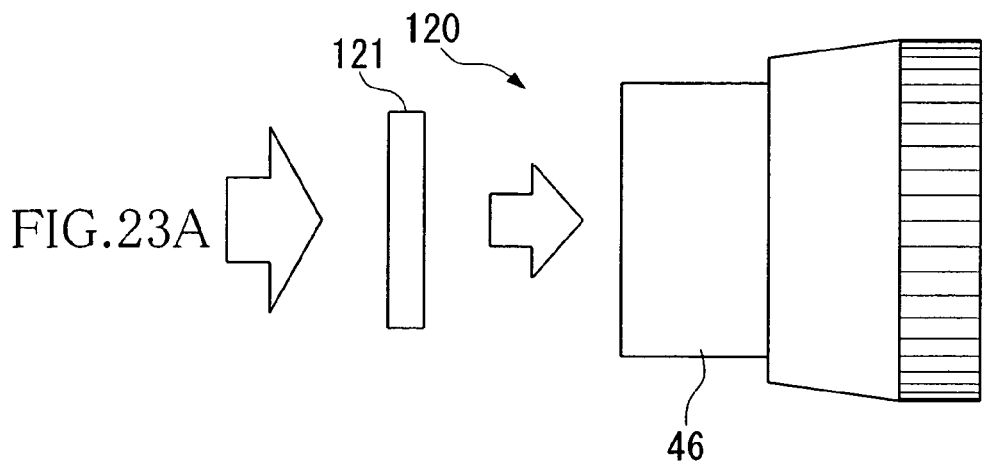
FIG. 23A is a schematic construction view of a projector according to an eighth embodiment of the present invention.
Figure 23B:
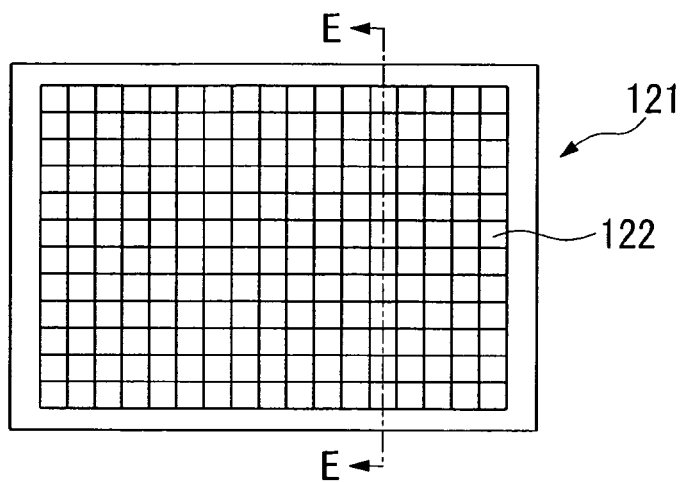
FIG. 23B is a front view which shows a display device according to the eighth embodiment of the present invention.
Figure 23C:
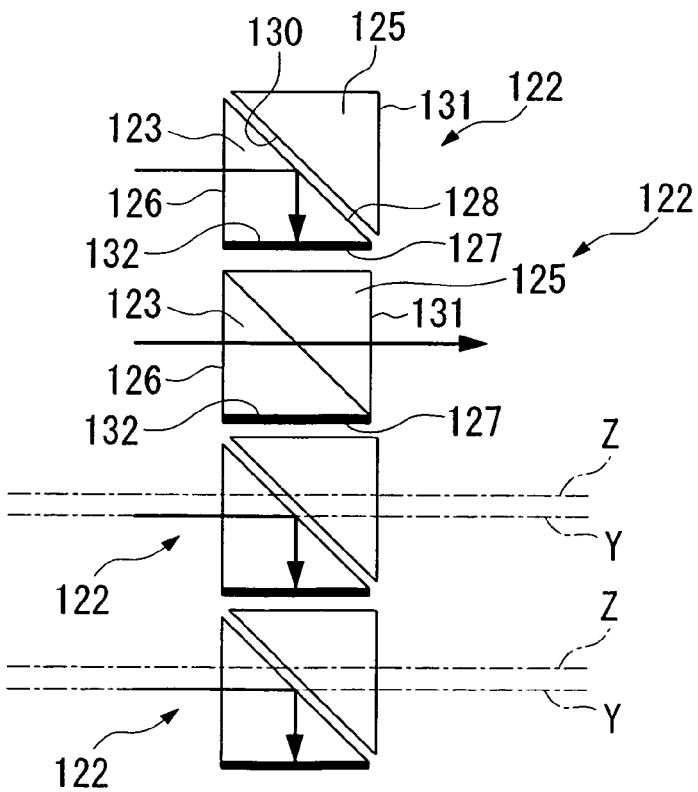
FIG. 23C is a partial enlarged view which shows section E—E of FIG. 23B according to the eighth embodiment of the present invention.

The point of difference between the eighth embodiment and the first embodiment is that the display device 121 of the projector 120 according to the present embodiment shown in FIG. 23A is provided with a plurality of light guiding apparatuses 122 shown in FIG. 23B, and as shown in FIG. 23C, each light guiding apparatus 122 is provided with a first right-angled prism 123 corresponding to the main rod 17, and a second right-angled prism 125 corresponding to the secondary rod 18.

In each light guiding apparatus 122, the surface viewed perpendicularly to the first right-angled prism 123 is the light entry surface 126 and the first light emitting end surface 127, while the other surface is the first side surface 128, and the surface which is arranged contacting at 45 degrees against the second right-angled prism 125 is the second side surface 130 and the second light emitting end surface 131 which face the first side surface 128, the light absorbing portion 132 which absorbs emitted light is arranged at the first light entry end surface 127, and, in each light guiding apparatus 122, normal lines Y of the light entry surfaces are parallel to each other, and normal lines Z of the second light emitting end surfaces 131 are parallel to each other, and the normal lines Y and the normal lines Z are parallel to each other.

Next, the operation methods of the display device 121 and the projector 120 which is provided with the display device 121 according to the present embodiment, and the function and the effects thereof are explained.

First, the emitted light which is made to be in an approximate beam form by operating the lighting apparatus enters the first right-angled prism 123 from the direction of the normal line Y Here, when the emitted light is blocked, as shown in the light guiding apparatus 12 which is arranged first from the top in FIG. 23C, the first right-angled prism 123 and the second right-angled prism 125 are in the state in which they are separated from each other.

When the emitted light enters from the light entry surface 126 in this state, all of the emitted light is reflected by the first side surface 128, and is guided to the first light emitting end surface 127. In this case, because the light absorbing portion 132 is provided, the emitted light is absorbed by the light absorbing portion 132, and, without emitting from the first right-angled prism 123, the emitted light is blocked.

On the other hand, when the emitted light is transmitted, as shown in the light guiding apparatus 122 second from the top in FIG. 23C, the first right-angled prism 123 and the second right-angled prism 125 are in the state in which they are in contact with each other.

When the emitted light enters from the light entry surface 126 in this state, the emitted light is transmitted into the first side surface 128, and is guided from the second side surface 130 to the inside of the second right-angled prism 125. Furthermore, the emitted light is emitted from the second light emitting end surface 131 in the direction of normal line Z.

Thus, based on the input image, for every light guiding apparatuses 122, the contact state and the separated state of the first right-angled prism 123 and the second right-angled prism 125 are adjusted between, and thereby the modulated emitted light is emitted into the projection optical portion 6, and is projected onto the screen 47.

According to the present display device 121, by adjusting between the contact state and the separated state of the first right-angled prism 123 and the second right-angled prism 125 for every light guiding apparatus 122, in light guiding apparatuses 122 which are in the contact state, without changing the direction of the emitted light which enters the light entry surface 126 of the first right-angled prism 123, the emitted light is transmitted into the second right-angled prism 125, and can be emitted from the second light emitting end surface 131. Moreover, in the light guiding apparatuses 122 which are in the separated state, all of emitted light which enters from the light entry surface 126 is reflected by the first side surface 128, is guided to the first light emitting end surface 127, and is absorbed by the light absorbing portion 132, and thereby blocking of the light can be performed. In this case, a complete reflection condition of the prism can be used, and modulation in which the light loss is very low can be performed.

Moreover, according to the present projector 120, using a simple constitution due to use of a transmission method, not a polarization method, the emitted light can be suitably modulated. In this case, only by contacting or separating the first right-angled prism 123 and the second right-angled prism 125, transmission and blocking can be changed at high speed, and modulation speed can be improved.

While preferred embodiments of the invention have been described and illustrated above, it should be understood that these are exemplary of the invention and are not to be considered as limiting. Additions, omissions, secondary stitutions, and other modifications can be made without departing from the spirit or scope of the present invention. Accordingly, the invention is not to be considered as being limited by the foregoing description, and is only limited by the scope of the appended claims.

For example, in the above-mentioned embodiment, although the first transparent member and the second transparent member are quadrangular pillar forms, they are not limited to the above, and the other multi-angular forms may be applied. Moreover, the first side surface and the second side surface may be curved surfaces.

In the present light guiding apparatus, when the second transparent member is separated from the first transparent member, all of emitted light which enters from the light entry surface may be reflected by the first side surface of the first transparent member, and can be guided to the first light emitting end surface. On the other hand, when the second transparent member is in contact with the first transparent member; the emitted light which may enter from the light entry surface enters the second side surface from the first side surface, and further, all of the emitted light may be reflected by the third side surface, and can be led to the first light emitting end surface.

Therefore, in the cases in which the second transparent member is in contact with the first transparent member, and the second transparent member is separated from the first transparent member, the emitted light can be emitted at diffusion angles which are distinctly different from each other.

Moreover, in the present light guiding apparatus, when the second transparent member is separated from the first transparent member, all of emitted light which enters from the light entry surface may be reflected by the first side surface of the first transparent member, and can be led to the first light emitting end surface. On the other hand, when the second transparent member is in contact with the first transparent member, the emitted light which enters from the light entry surface enters the second side surface from the first side surface, and can be led to the second light emitting end surface.

Moreover, in the light guiding apparatus according to the present invention, the transparent member holding portion may be provided with an elastic body which presses the second transparent member toward a direction of the first transparent member, and a separation portion which reverses a pressed state of the elastic body. In the present light guiding apparatus, the second transparent member can normally be in contact with the first transparent member due to the action of the elastic body, and the second transparent member can be separated from the first transparent member by operating the separation portion.

Moreover, in the light guiding apparatus according to the present invention, the separation portion may be an electromagnet. In the present light guiding apparatus, by ON/OFF switching of the electromagnet, switching between contact/separation states of the second transparent member and the first transparent member can be easily performed.

Moreover, in the light guiding apparatus according to the present invention, the separation portion may be provided with a rotation portion in which, about a normal line which passes through a center of the first light emitting end surface as a rotation axis, the first transparent member and the second transparent member are rotated, and centrifugal force which is greater than pressing force of the elastic body is generated on the second transparent member. In the present light guiding apparatus, by generating the centrifugal force for the second transparent member by driving the rotation portion, the second transparent member can be easily separated from the first transparent member.

Moreover, in the light guiding apparatus according to the present invention, a direction of the normal line of the first light emitting end surface may be a direction of a longitudinal axis of the first transparent member, and the second transparent member may have a second light emitting end surface which emits at least, one among the emitted light entered from the second side surface and the emitted light guided by the third side surface, and is arranged along the direction of the longitudinal axis.

In the present light guiding apparatus, when the second transparent member is in contact with the first transparent member, the emitted light can be also emitted from the second transparent member. Therefore, in the cases in which the first transparent member and the second transparent member are in contact with each other, and the first transparent member and the transparent member are separated from each other, the same quantity of emitted light can be secured, and in the case in which the first transparent member and the second transparent member are in contact with each other, a higher contrast of emitted light can be emitted than in the case in which the first transparent member and the second transparent member are separated from each other.

Moreover, in the light guiding apparatus according to the present invention, when a profile of the first transparent member viewed perpendicularly to the direction of the longitudinal axis of the first transparent member is a first profile, a cross-section of the first profile may gradually increase from the light entry surface side to a side of the first light emitting end surface, and when a profile of the second transparent member viewed perpendicularly to the direction of the longitudinal axis of the first transparent member is a second profile, a cross-section of the second profile may gradually enlarge from a side of the light entry surface to a side of the first light emitting end surface.

In the present light guiding apparatus, in the state in which the second transparent member is in contact with the first transparent member, the emitted beam of the emitted light can be widened, and on the other hand, the diffusion angle can be small.

Moreover, in the state in which the second transparent member is separated from the first transparent member, the emitted beam of the emitted light can be narrowed, and on the other hand, the diffusion angle can be large.

Moreover, in the light guiding apparatus according to the present invention, when a profile of the first transparent member viewed perpendicularly to the direction of the longitudinal axis of the first transparent member is a first profile, a cross-section of the first profile may gradually enlarge from a side of the light entry surface to a side of the first light emitting end surface, and when a profile of the second transparent member viewed perpendicularly to the direction of the longitudinal axis of the first transparent member is a second profile, a cross-section of the second profile may gradually get smaller from a side of the light entry surface to a side of the first light emitting end surface, and a cross-section of a total profile which is composed of the first profile and the second profile which is formed when the second transparent member is in contact with the first transparent member may be approximately the same at unprescribed positions in the direction of the longitudinal axis.

In the present light guiding apparatus, in the state in which the second transparent member is in contact with the first transparent member, without changing the diffusion angle of the emitted light, emitting of the light can be performed.

Moreover, in the state in which the second transparent member is separated from the first transparent member, in the state of the emitted beam of the emitted light which is approximately same state as that at the time of contacting the transparent members, the diffusion angle of the emitted light can be increased.

Moreover, in the light guiding apparatus according to the present invention, when a profile of the first transparent member viewed perpendicularly to the direction of the longitudinal axis of the first transparent member is a first profile, cross-sections of the first profile may be approximately the same at unprescribed positions in the direction of the longitudinal axis, and when a profile of the second transparent member viewed perpendicularly to the direction of the longitudinal axis of the first transparent member is a second profile, a cross-section of the second profile may gradually enlarge from a side of the light entry surface side to the first light emitting end surface.

In the light guiding apparatus, in the state in which the second transparent member is in contact with the first transparent member, the emitted beam of the emitted light can be widened, and on the other hand, the diffusion angle can be small.

Moreover, in the state in which the second transparent member is separated from the first transparent member, the diffusion angle of the emitted light is not changed, and the emitted beam of the emitted light can be narrowed.

Moreover, in the light guiding apparatus according to the present invention, both the first side surface and the second side surface may be planar surfaces.

In the present light guiding apparatus, when the second transparent member is in contact with the first transparent member, the first side surface and the second side surface can be in contact with each other without nonuniformity, and a more suitable contact state can be maintained.

Moreover, in the light guiding apparatus according to the present invention, an index of refraction of a medium which constitutes the first transparent member and an index of refraction of a medium which constitutes the second transparent member may be the same. In the present light guiding apparatus, when the emitted light is guided through the first transparent member and the second transparent member in the state in which the second transparent member and the first transparent member are in contact with each other, without changing the propagation direction of the emitted light, and the emitted light can be emitted with a desirable NA.

Moreover, in the light guiding apparatus according to the present invention, the light entry surface may be a planar surface viewed perpendicularly to the normal line of the first light emitting end surface, a total light emitting surface may be formed by the first light emitting end surface and the second light emitting end surface in a state in which the second transparent member is in contact with the first transparent member, and the light emitting surface and the total light emitting surface may have shapes similar to each other.

In the light guiding apparatus, in both cases in which the second transparent member is in contact with the first transparent member, and the second transparent member is separated from the first transparent member, the light emitting end surface can have similar shape to that of the light entry surface.

Moreover, in the light guiding apparatus according to the present invention, a plurality of parts of the first side surface may be arranged in axial symmetry with respect to the longitudinal axis, and a plurality of parts of the second transparent member may be arranged so that the parts of the second side surface face each part of the first side surface so that the second side surface can be in contact with the first side surface. In the present light guiding apparatus, when the second transparent member is in contact with the first transparent member, the second side surface can be in contact with all of the first side surface, the states of contact/separation are not mixed, and the emitted light in each state can be emitted from the first light emitting end surface.

Moreover, in the light guiding apparatus according to the present invention, a light absorbing portion which absorbs the emitted light may be arranged on the second light emitting end surface.

Moreover, in the light guiding apparatus according to the present invention, a light reflection portion which reflects the emitted light may be arranged at the second light emitting end surface.

According to the present light guiding apparatus, because the emitting of the light from the second light emitting end surface is regulated by the light absorbing portion or the light reflection portion, regardless of the contact state or separation state between the first transparent member and the second transparent member, the emitted light can be emitted from only the first light emitting end surface, and when the emitted light of which the diffusion angle is different is emitted, a constant light emitting area can be maintained.

Moreover, in the light guiding apparatus according to the present invention, a first light reflection portion which is approximately parallel to the first light emitting end surface, and reflects the emitted light may be arranged near the light entry surface of the first transparent member. In the light guiding apparatus, when the emitted light enters from the light entry surface in the state in which the second transparent member is in contact with the first transparent member, even if the emitted light is reflected by the light reflection portion, and is returned to the light entry surface side, the propagation direction of the emitted light can be changed toward the first light emitting end surface side again by the first light reflection portion, therefore, the reuse rate of the emitted light can be increased.

Moreover, in the light guiding apparatus according to the present invention, a second light reflection portion which is approximately parallel to the second light emitting end surface, and reflects the emitted light may be arranged at the second transparent member near the light entry surface. In the light guiding apparatus, the emitted light which is reflected toward the light entry surface side by the light reflection portion can be reflected by the second light reflection portion again. Therefore, the emitted light which is guided within the second transparent member can be emitted from the first light emitting end surface without any waste, and the quantity of light can be increased.

Moreover, in the light guiding apparatus according to the present invention, a quantity of light detection portion which detects the quantity of light of a part of the emitted light which reaches the light absorbing portion or the light reflection portion may be provided. In the present light guiding apparatus, when the second transparent member is in contact with the first transparent member, the quantity of the emitted light which is guided to the second light emitting end surface can be detected by the quantity of light detection portion, and according to the detected result, the quantity of light from the light source can be changed, and can be adjusted to a predetermined quantity of light.

Moreover, in the light guiding apparatus according to the present invention, a light absorbing portion which absorbs the emitted light may be arranged on the first light emitting end surface. In the light guiding apparatus, when the second transparent member is separated from the first transparent member, the emitted light which enters from the light entry surface can be blocked, and when the second transparent member is in contact with the first transparent member, all of the emitted light which enters may be guided from the first side surface into the second transparent member, and can be emitted from the second side surface.

Moreover, a lighting apparatus according to the present invention is provided with the light guiding apparatus according to the present invention, a light source portion which emits the emitted light, a mode selection portion which selects one of a wide angle light emitting mode which performs wide angle light emitting and a narrow angle light emitting mode which performs narrow angle light emitting as a light emitting mode in which the light is emitted from the light guiding apparatus, in which the wide angle light emitting mode is in a state in which the second transparent member is separated from the first transparent member, and the narrow angle light emitting mode is in a state in which the second transparent member is in contact with the first transparent member.

In the present lighting apparatus, because the light guiding apparatus according to the present invention is provided, by performing the mode switching using the mode selection portion, the second transparent member can be in contact with the first transparent member, or the second transparent member can be separated from the first transparent member, and either one of wide angle light and narrow angle light can be emitted.

Moreover, in the lighting apparatus according to the present invention, a reflection surface may be provided by which the emitted light emitted from the light source portion is reflected once, and enters the first transparent member.

In the present lighting apparatus, in addition to emitted light which directly enters the first transparent member, emitted light is reflected by the reflection surface can enter the first transparent member. Therefore, the emitted light can be efficiently transmitted into the first transparent member.

Moreover, a space modulation part according to the present invention is a space modulation part which is modulated according to image information which is input, and is provided with a plurality of light guiding apparatuses according to the present invention, wherein, in the light guiding apparatuses, normal lines of the light entry surfaces are parallel to each other, and normal lines of the second light emitting end surfaces are parallel to each other, and the normal lines of the light emitting surfaces and the normal lines of the second light emitting end surfaces are parallel to each other. In the present space modulation part, for each light guiding apparatus, by adjusting the contact/separation state between the first transparent member and the second transparent member, in light guiding apparatuses in which the second transparent member is in contact with the first transparent member, the emitted light which enters from the light entry surface can be emitted from the second light emitting end surface, and, in the light guiding apparatuses in which the second transparent member is separated from the first transparent member, the emitted light which enters the light entry surface can be absorbed by the light absorbing portion, and can be blocked.

Moreover, in the space modulation part according to the present invention, the first transparent member and the second transparent member may be right-angled prisms, the light entry surface and the first light emitting end surface may be perpendicularly arranged, and the second side surface and the second light emitting end surface may be arranged to be in contact with each other at an angle of 45 degrees.

In the space modulation part, by adjusting the contact/separation state of the first transparent member and the second transparent member for every light guiding apparatus, in light guiding apparatuses which are in the contact state, without changing the direction of the emitted light which enters the first transparent member, the emitted light can be transmitted into the second transparent member, and can be emitted from the second light emitting end surface. Moreover, in light guiding apparatuses in the separation state, all of emitted light which enters the light emitting surface may be reflected by the first side surface, and is guided to the first light emitting end surface, and the emitted light can be blocked by absorbing the emitted light at the light absorbing portion. In this case, a complete reflection condition of the prism can be used, and modulation in which the light loss is very small can be performed.

Moreover, an image projection apparatus according to the present invention is an image projection apparatus which projects an image according to image information which is input so that an observer observes the image, is provided with the lighting apparatus according to the present invention, a space modulation part which is modulated according to the image information which is input, a light emitting optical portion which guides the emitted light emitted from at least a first light emitting end surface, and illuminates the space modulation part, and a projection optical portion which projects the image which is lightened by the light emitting optical portion, and is modulated by the space modulation part.

In the present image projection apparatus, because the lighting apparatus according to the present invention is provided, by performing mode switching, the second transparent member can be in contact with the first transparent member, or the second transparent member can be separated from the first transparent member, and even if only one lighting apparatus is provided, emitted light which has two types of diffusion angle can be emitted into the space modulation part.

Moreover, in the image projection apparatus according to the present invention, the space modulation part may be the space modulation part according to the present invention.

Because the present image projection apparatus is provided with the space modulation part according to the present invention, having a simple constitution using a transmission method, not a polarization method, the emitted light can be suitably modulated. In this case, only by contacting or separating the first transparent member and the second transparent member, transmission and the blocking can be switched between, and modulation speed can be improved.

According to the present invention, the second transparent member is in contact With the first transparent member, or the second transparent member is separated from the first transparent member, and thereby, even if only one light guiding apparatus is provided, emitted light can be emitted at diffusion angles which are distinctly different from each other.

What is claimed is:

1. A light guiding apparatus which guides emitted light emitted from a light source, comprising:
    a first transparent member which is solid;
    a second transparent member which is solid and is moved relatively to the first transparent member to take a contact position where the second transparent member is in contact with the first transparent member or a separate position where the second transparent member is separated from the first transparent member; and
    a transparent member holding portion which moves the second transparent member relatively to the first transparent member, and holds the second transparent member in one of the contact or separate position,
    wherein the first transparent member is provided with a light entry surface into which the emitted light enters, a first side surface in which light guidance is performed to the emitted light entering the light entry surface by way of complete reflection by an inner surface thereof when the second transparent member is in the separate position, and in which the emitted light is transmitted into the second transparent member when the second transparent member is in contact, and a first light emitting end surface which emits the emitted light which is guided, and
    wherein the second transparent member is provided with a second side surface which faces the first side surface so that the second side surface can contact the first side surface, and a third side surface in which, when the second side surface and the first side surface are in contact with each other, light guidance toward at least the first light emitting end surface is performed to the emitted light which is entering the second side surface by way of complete reflection by an inner surface thereof.

2. A light guiding apparatus which guides emitted light emitted from a light source, comprising:
    a first transparent member which is solid;
    a second transparent member which is solid and is moved relatively to the first transparent member to take a contact position where the second transparent member is in contact with the first transparent member or a separate position where the second transparent member is separated from the first transparent member; and
    a transparent member holding portion which moves the second transparent member relatively to the first transparent member, and holds the second transparent member in one of the contact or separate position,
    wherein the first transparent member is provided with a light entry surface into which the emitted light enters, a first side surface in which light guidance is performed to the emitted light entering the light entry surface by way of complete reflection by an inner surface thereof when the second transparent member is in the separate position, and in which the emitted light is transmitted into the second transparent member when the second transparent member is in the contact position, and a first light emitting end surface which emits the emitted light which is guided, and
    wherein the second transparent member is provided with a second side surface which faces the first side surface so that the second side surface can contact the first side surface, and a second light emitting end surface which emits the emitted light entering the second side surface.

3. A light guiding apparatus according to claim 1, wherein the transparent member holding portion is provided with an elastic body which presses the second transparent member toward a direction of the first transparent member, and a separation portion which reverses a pressed state created by the elastic body.

4. A light guiding apparatus according to claim 3, wherein the separation portion is an electromagnet.

5. A light guiding apparatus according to claim 3, wherein the separation portion is provided with a rotation portion which drives the first transparent member and the second transparent member to rotate about a normal line which passes through a center of the first light emitting end surface as a rotation axis so as to cause the second transparent member to generate centrifugal force which is greater than a pressing force of the elastic body.

6. A light guiding apparatus according to claim 1, wherein:
a direction of a normal line of the first light emitting end surface is a direction of a longitudinal axis of the first transparent member; and
the second transparent member has a second light emitting end surface which emits at least one of the emitted light entering the second side surface and the emitted light guided by the third side surface, and is arranged along the direction of the longitudinal axis.

7. A light guiding apparatus according to claim 6, wherein:
when a profile of the first transparent member viewed perpendicularly to the direction of the longitudinal axis of the first transparent member is a first profile, a cross-section of the first profile gradually enlarges from a side of the light entry surface to a side of the first light emitting end surface; and
when a profile of the second transparent member viewed perpendicularly to the direction of the longitudinal axis of the first transparent member is a second profile, a cross-section of the second profile gradually enlarges from a side of the light entry surface to a side of the first light emitting end surface.

8. A light guiding apparatus according to claim 6, wherein:
when a profile of the first transparent member viewed perpendicularly to the direction of the longitudinal axis of the first transparent member is a first profile, a cross-section of the first profile gradually enlarges from a side of the light entry surface to a side of the first light emitting end surface;
when a profile of the second transparent member viewed perpendicularly to the direction of the longitudinal axis of the first transparent member is a second profile, a cross-section of the second profile gradually gets smaller from a side of the light entry surface to a side of the first light emitting end surface; and
cross-sections of a total profile, which is composed of the first profile and the second profile which are formed when the second transparent member is in the contact position, are approximately the same at unprescribed positions in the direction of the longitudinal axis.

9. A light guiding apparatus according to claim 6, wherein:
when a profile of the first transparent member viewed perpendicularly to the direction of the longitudinal axis of the first transparent member is a first profile, cross-sections of the first profile are approximately the same at unprescribed positions in the direction of the longitudinal axis; and
when a profile of the second transparent member viewed perpendicularly to the direction of the longitudinal axis of the first transparent member is a second profile, a cross-section of the second profile gradually enlarges from a side of the light entry surface to a side of the first light emitting end surface.

10. A light guiding apparatus according to claim 6, wherein both the first side surface and the second side surface are planar surfaces.

11. A light guiding apparatus according to claim 6, wherein an index of refraction of a medium which constitutes the first transparent member and an index of refraction of a medium which constitutes the second transparent member are the same.

12. A light guiding apparatus according to claim 6, wherein:
the light entry surface is a planar surface viewed perpendicularly to a normal line of the first light emitting end surface;
a total light emitting surface is formed by the first light emitting end surface and the second light emitting end surface in a state in which the second transparent member is in the contact position; and
the light entry surface and the total light emitting surface have similar shapes to each other.

13. A light guiding apparatus according to claim 6, wherein:
a plurality of parts of the first side surface are arranged in axial symmetry with respect to the longitudinal axis; and
a plurality of parts of the second transparent member are arranged so that the second side surface faces each first side surface so that the second side surface can contact the first side surface.

14. A light guiding apparatus according to claim 6, wherein a light absorbing portion which absorbs the emitted light is arranged at the second light emitting end surface.

15. A light guiding apparatus according to claim 6, wherein a light reflection portion which reflects the emitted light is arranged at the second light emitting end surface.

16. A light guiding apparatus according to claim 15, wherein a first light reflection portion which is approximately parallel to the first light emitting end surface and reflects the emitted light is arranged near the light entry surface of the first transparent member.

17. A light guiding apparatus according to claim 15, wherein a second light reflection portion which is approximately parallel to the second light emitting end surface, and reflects the emitted light is arranged on the second transparent member near the light entry surface.

18. A light guiding apparatus according to claim 14, further comprising a quantity of light detection portion which detects a quantity of light of a part of the emitted light which reaches the light absorbing portion or the light reflection portion.

19. A light guiding apparatus according to claim 2, wherein a light absorbing portion which absorbs the emitted light is arranged on the first light emitting end surface.

20. A lighting apparatus, comprising:
a light guiding apparatus according to claim 1;
a light source portion which emits the emitted light; and
a mode selection portion which selects one of a wide angle light emitting mode in which wide angle light emitting is performed and a narrow angle light emitting mode in which narrow angle light emitting is performed as a light emitting mode in which light is emitted from the light guiding apparatus,
wherein the wide angle light emitting mode is in a state in which the second transparent member is separated from the first transparent member, and the narrow angle light emitting mode is in a state in which the second transparent member is in contact with the first transparent member.

21. A lighting apparatus according to claim 20, further comprising a reflection surface from which the emitted light emitted from the light source portion is reflected once, and enters the first transparent member.

22. A space modulation part which is modulated according to image information which is input, comprising:
    a plurality of light guiding apparatuses according to claim 19,
    wherein, in the light guiding apparatuses, normal lines of the light entry surfaces are parallel to each other, and normal lines of the second light emitting end surfaces are parallel to each other.

23. A space modulation part according to claim 22, wherein:
    the first transparent member and the second transparent member are right-angled prisms;
    the light entry surface and the first light emitting end surface are perpendicularly arranged; and
    the second side surface and the second light emitting end surface are arranged in contact with each other at an angle of 45 degrees.

24. An image projection apparatus which projects an image according to image information which is input so that an observer observes the image, comprising:
    the lighting apparatus according to claim 20;
    a space modulation part which is modulated according to the image information which is input;
    a light emitting optical portion which guides the emitted light emitted from at the least first light emitting end surface, and illuminates the space modulation part; and
    a projection optical portion which projects an image which is cast by the light emitting optical portion, and is modulated by the space modulation part.

25. An image projection apparatus according to claim 24, wherein the space modulation part is modulated according to image information which is input and comprises a plurality of light guiding apparatuses wherein:
    a light absorbing portion which absorbs the emitted light is arranged on the first light emitting end surface;
    the second transparent member has a second light emitting end surface which emits at least one of the emitted light entering the second side surface and the emitted light guided by the third side surface, and is arranged along the direction of the longitudinal axis;
    in the light guiding apparatuses, normal lines of the light entry surfaces are parallel to each other, and normal lines of the second light emitting end surfaces are parallel to each other;
    the first transparent member and the second transparent member are right-angled prisms;
    the light entry surface and the first light emitting end surface are perpendicularly arranged; and
    the second side surface and the second light emitting end surface are arranged in contact with each other at an angle of 45 degrees.

26. A light guiding apparatus according to claim 15, further comprising a quantity of light detection portion which detects a quantity of light of a part of the emitted light which reaches the light absorbing portion or the light reflection portion.

27. A light guiding apparatus according to claim 6, wherein a light absorbing portion which absorbs the emitted light is arranged on the first light emitting end surface.

28. A space modulation part which is modulated according to image information which is input, comprising:
    a plurality of light guiding apparatuses according to claim 27,
    wherein, in the light guiding apparatuses, normal lines of the light entry surfaces are parallel to each other, and normal lines of the second light emitting end surfaces are parallel to each other.

* * * * *